United States Patent
Yoshida

(10) Patent No.: US 8,447,928 B2
(45) Date of Patent: May 21, 2013

(54) ELECTRONIC APPARATUS, SERVER, AND METHOD FOR CONTROLLING ELECTRONIC APPARATUS

(75) Inventor: Fumiyuki Yoshida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 721 days.

(21) Appl. No.: 12/611,445

(22) Filed: Nov. 3, 2009

(65) Prior Publication Data
US 2010/0131709 A1 May 27, 2010

(30) Foreign Application Priority Data
Nov. 26, 2008 (JP) ................................ 2008-301387

(51) Int. Cl.
G06F 12/00 (2006.01)
G06F 15/173 (2006.01)

(52) U.S. Cl.
USPC .................... 711/115; 711/E12.001; 709/223

(58) Field of Classification Search ........................ None
See application file for complete search history.

(56) References Cited

U.S. PATENT DOCUMENTS

| 5,625,671 A | * | 4/1997 | Salin ............................ 455/411 |
| 5,974,472 A | * | 10/1999 | Urabe ............................ 710/2 |
| 2009/0009789 A1 | | 1/2009 | Yoshida |
| 2009/0122338 A1 | | 5/2009 | Yoshida |

FOREIGN PATENT DOCUMENTS

| JP | 5-217044 A | 8/1993 |
| JP | 2002-199330 A | 7/2002 |
| JP | 2003-114834 | 4/2003 |
| JP | 2004-342217 A | 12/2004 |
| JP | 2006-505201 A | 2/2006 |
| JP | 2006-59040 A | 3/2006 |
| JP | 2006-178007 | 7/2006 |
| JP | 2008-65832 | 3/2008 |
| WO | WO 2007/105525 A1 | 9/2007 |

* cited by examiner

*Primary Examiner* — Denise Tran
(74) *Attorney, Agent, or Firm* — Oblon, Spivak, McClelland, Maier & Neustadt, L.L.P.

(57) ABSTRACT

An electronic apparatus stores therein information that includes a first list, a second list, and a third list. The first list contains a list of memory devices usable with the electronic apparatus, the second list contains a list of memory devices for which it is not certain whether the memory devices are usable with the electronic apparatus, and the third list contains a list of memory devices unusable with the electronic apparatus. A determining unit determines, by using the information, whether a connected memory device is usable or unusable with the electronic apparatus or determines that it is not certain whether the connected memory device is usable with the electronic apparatus.

4 Claims, 19 Drawing Sheets

| COMMUNICATION ID |
| DATA 1 |
| DATA 2 |
| ⋮ |
| DATA n |

LIST-UPDATE DATE REQUEST

LIST-UPDATE DATE REPLY

LIST REQUEST

LIST REPLY

AUTOMATIC-TEST ITEM DATE REQUEST

AUTOMATIC-TEST ITEM DATE REPLY

AUTOMATIC-TEST ITEM REQUEST

AUTOMATIC-TEST ITEM REPLY

FIG. 23

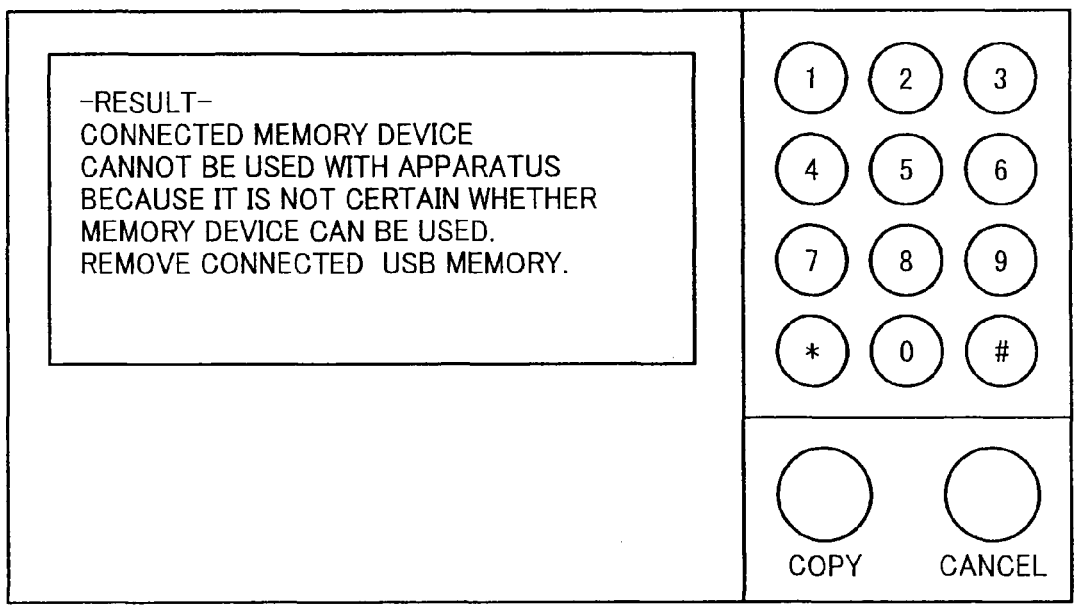

FIG. 24

TOTAL TEST NUMBER NOTIFICATION

| COMMUNICATION ID (TOTAL TEST NUMBER NOTIFICATION) |
|---|
| DATA PART 1 (NUMBER OF USB MEMORIES ON WHICH TEST HAS BEEN CONDUCTED) |
| DATA PART 2 (ID OF DEVICE 1) |
| DATA PART 3 (TOTAL NUMBER OF PASSES) |
| DATA PART 4 (TOTAL NUMBER OF FAILURES) |
| DATA PART 5 (ID OF DEVICE 2) |
| DATA PART 6 (TOTAL NUMBER OF PASSES) |
| DATA PART 7 (TOTAL NUMBER OF FAILURES) |

THREE ENTRIES ARE GENERATED FOR EACH DEVICE

ELECTRONIC APPARATUS, SERVER, AND METHOD FOR CONTROLLING ELECTRONIC APPARATUS

CROSS-REFERENCE TO RELATED APPLICATIONS

The present application claims priority to and incorporates by reference the entire contents of Japanese Patent Application No. 2008-301387 filed in Japan on Nov. 26, 2008.

BACKGROUND OF THE INVENTION

1. Field of the Invention

The present invention relates to an electronic apparatus to which a dynamically removable memory device can be connected, a server to be connected to the electronic apparatus via a network, and a control method for controlling the electronic apparatus, whereby it can be easily determined whether the memory device can be used with the electronic apparatus.

2. Description of the Related Art

A large variety of removable memory devices (hereinafter, "memory devices"), such as secure digital (SD) cards or universal serial bus (USB) memories are manufactured by various companies all over the world. The memory devices have superior portability, and the memory capacity of the memory devices has been dramatically increasing in recent years. In addition, the memory devices are inexpensive and have rapidly spread among users.

In view of the above circumstances, although the memory devices used to be used only with an information-processing apparatus such as a personal computer (PC), the memory devices are now also used with various electronic apparatuses (hereinafter, an electronic apparatus to which a memory device is connectable is referred to as "apparatus") such as home electronics.

There is a standard for the memory devices. The memory devices are manufactured so as to meet the standard so that the memory devices can be connected without any problems to various apparatuses that are in conformity with the standard.

The problem is that some memory devices have such poor quality that they fail to meet the standard. If such a non-standard memory device is connected to an apparatus, the apparatus can malfunction. The malfunction can occur in the apparatus to various degrees, for example, the operation of the apparatus is stopped, or, although the apparatus recognizes the memory device, the apparatus cannot perform writing and reading operations to and from the memory device. Thus, inconvenience is caused to users.

Manufacturers conduct some tests on an apparatus before the apparatus is put on the market. If the apparatus has functions that use memory devices, the manufacturer conducts some tests on the functions by using various types of memory devices. However, it is impractical in terms of cost and time for manufacturers to perform tests on the functions by using all the memory devices available on the market. Therefore, the manufacturer usually selects typical memory devices from the memory devices available on the market and conducts the tests by using these selected memory devices. The manufacturer often treats the typical memory devices that pass the tests as recommended memory devices and the other memory devices as memory devices that are not supported by the apparatus.

Therefore, if a user has a memory device that is not a recommended memory device, because the user is not sure if the memory device can be used with the apparatus, the user uses the memory device in the apparatus taking a risk that the apparatus can malfunction. Japanese Patent Application Laid-open No. 2003-114834 discloses a USB-device evaluation system in which if a problem occurs when a USB device is operated with a PC during evaluation of the operation of the USB device, the status of a USB bus during the occurrence of the problem is recorded in order to find and remove the cause of the problem.

The limitation with the technology disclosed in Japanese Patent Application Laid-open No. 2003-114834 is that it is possible only to solve the problem when it occurs. Therefore, if the user has a memory device that is not a recommended memory device, the user uses the memory device in the apparatus taking a risk that the apparatus can malfunction.

It is inconvenient for the user to check that a memory device is a recommended memory device or to remember the names of recommended memory devices. Furthermore, it is disadvantageous for the user to prepare a recommended memory device each time the user needs to use a memory device.

As described above, it is difficult in terms of cost and time for the manufacturer to conduct tests on memory devices available on the market one by one. Furthermore, it is also difficult in terms of cost for the manufacturer to examine what kinds of memory devices available on the market are often used.

SUMMARY OF THE INVENTION

It is an object of the present invention to at least partially solve the problems in the conventional technology.

According to an aspect of the present invention there is provided an electronic apparatus including a connecting structure for connecting thereto a dynamically removable memory device; a storing unit configured to store therein information that includes at least a first list that is a list of memory devices usable with the electronic apparatus, a second list that is a list of memory devices for which it is not certain whether those memory devices are usable with the electronic apparatus, and a third list that is a list of memory device unusable with the electronic apparatus; and a determining unit that determines, by using the information stored in the storing unit, whether a memory device connected to the connecting structure is usable or unusable with the electronic apparatus or determines whether it is not certain whether the memory device is usable with the electronic apparatus.

According to another aspect of the present invention there is provided a server including a storing unit configured to store therein information that includes at least a first list that is a list of memory devices usable with an electronic apparatus connected to the server via a network, a second list that is a list of memory devices for which it is not certain whether those memory devices are usable with the electronic apparatus, and a third list that is a list of memory device unusable with the electronic apparatus; a receiving unit that receives a result of a test from an electronic apparatus, the result indicating whether a memory device connected to the electronic apparatus is usable or unusable with the electronic apparatus or whether it is not certain whether the memory device is usable with the electronic apparatus; and an updating unit that autonomously updates the information stored in the storing unit based on the result received by the receiving unit.

According to still another aspect of the present invention there is provided a method of controlling an electronic apparatus. The electronic apparatus including a connecting structure for connecting thereto a dynamically removable memory device and a storing unit configured to store therein information that includes at least a first list that is a list of memory devices usable with the electronic apparatus, a second list that is a list of memory devices for which it is not certain whether those memory devices are usable with the electronic apparatus, and a third list that is a list of memory device unusable with the electronic apparatus. The method including determining, by using the information stored in the storing unit, whether a memory device connected to the connecting structure is usable or unusable with the electronic apparatus or determining whether it is not certain whether the memory device is usable with the electronic apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 23 is a schematic diagram that illustrates an example of the display of the LCD panel when the user has selected a selection button for "do not use the memory device"; and FIG. 24 is a diagram that illustrates the format of a total test number notification of the automatic test.

DETAILED DESCRIPTION OF THE PREFERRED EMBODIMENTS

Exemplary embodiments of the present invention are explained in detail below with reference to the accompanying drawings.

Figure 1A:
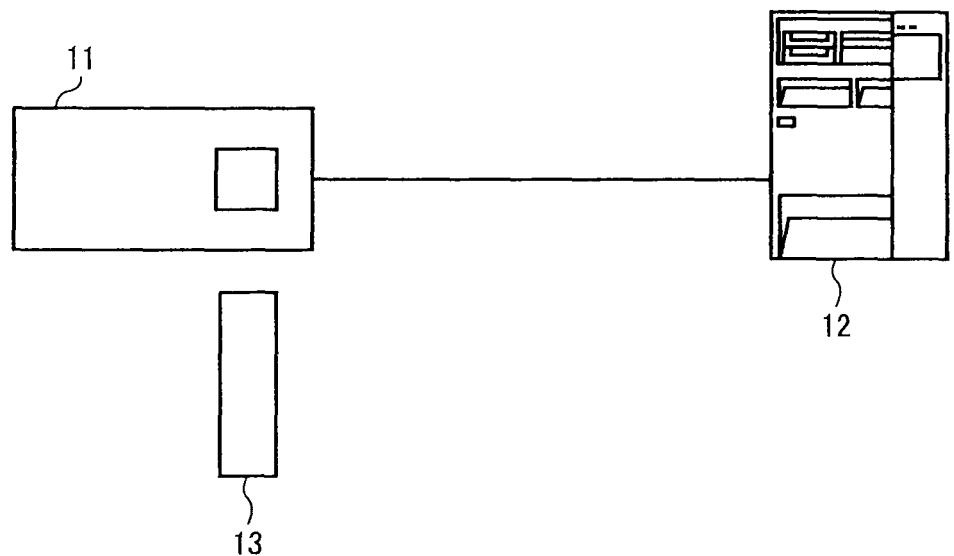
FIG. 1A is a schematic diagram that illustrates hardware configuration of a system according to an embodiment of the present invention.
Figure 1B:
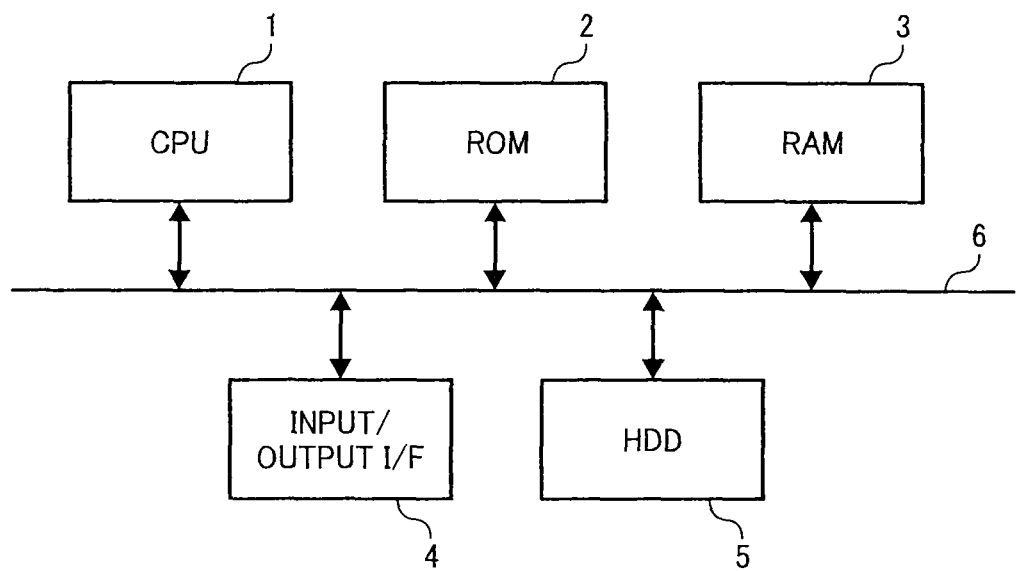
FIG. 1B is a block diagram of the hardware configuration built in an apparatus and a server shown in FIG. 1A.

FIG. 1A is a schematic diagram that illustrates hardware configuration of a system according to an embodiment of the present invention. FIG. 1B is a block diagram of hardware configuration built in an apparatus 11 and a server 12.

As shown in FIG. 1A, the system includes the apparatus 11, the server 12, and a removable memory device 13. The memory device 13 can be connected to the apparatus 11.

In accordance with the standard of memory devices, when a memory device is connected to an apparatus, the apparatus generally acquires the ID (hereinafter, "memory device ID") for uniquely identifying the memory device.

The memory device ID stored therein the ID (vendor ID) for identifying the manufacturer of the memory device and the ID (product ID or serial number) for identifying the memory device. For example, "enumeration" performed when a USB device is connected to an apparatus corresponds to a process for acquiring a memory device ID. In the embodiment, the memory device ID is acquired by a connection process, such as the enumeration, performed in accordance with the standard.

As shown in FIG. 1B, each of the apparatus 11 and the server 12 includes a central processing unit (CPU) 1, a read-only memory (ROM) 2, a random access memory (RAM) 3, an input/output interface (I/F) 4, and a hard disk drive (HDD) 5. The CPU 1 controls the apparatus 11 or the server 12. Control programs to be executed by the CPU 1 for controlling the apparatus 11 or the server 12 are stored in the ROM 2. The RAM 3 is used as a work area, and the like, for the CPU 1. The input/output I/F 4 mediates between the apparatus 11 or the server 12 and external devices. Various computer programs and data are stored in the HDD 5. The CPU 1, the ROM 2, the RAM 3, the input/output I/F 4, and the HDD 5 are connected to one another via a bus 6. The hardware configuration is implemented by using a general computer. The apparatus 11 can include an additional configuration to perform optional functions.

Figure 2:
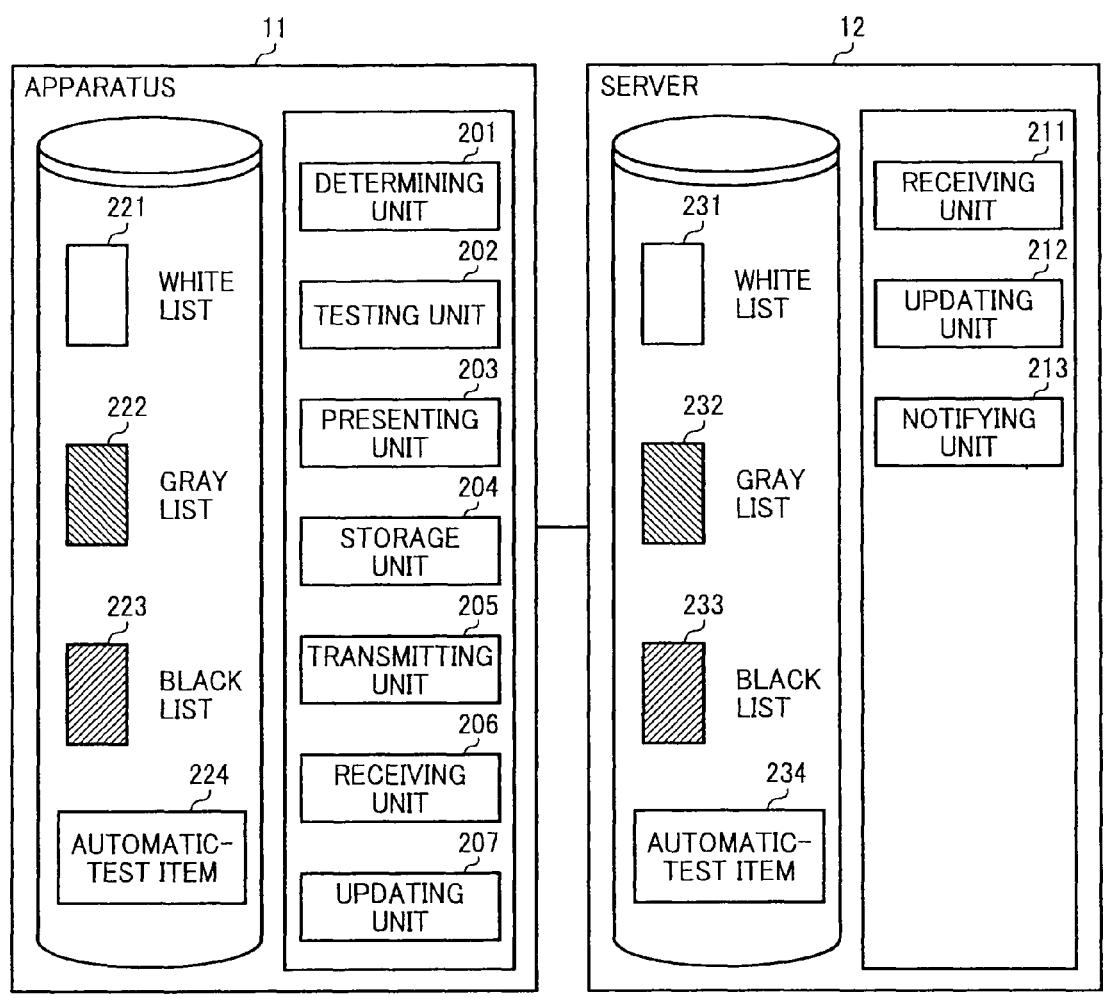
FIG. 2 is a functional block diagram of the apparatus and the server.

FIG. 2 is a functional block diagram of the apparatus 11 and the server 12.

Each of the apparatus 11 and the server 12 includes processing units that are executed by the CPU 1 in accordance with control programs. If data is transmitted and received to and from an external device in a process performed by each of the processing units, data is transmitted and received to and from the external device via the input/output I/F 4.

The apparatus 11 includes a determining unit 201, a testing unit 202, a presenting unit 203, a storage unit 204, a transmitting unit 205, a receiving unit 206, and an updating unit 207.

The determining unit 201 determines whether the memory device 13 connected to the apparatus 11 can be used with the apparatus 11 or determines that it is not certain whether the memory device 13 can be used with the apparatus 11 by using three lists, i.e., a white list (a recommended-device list), a gray list, and a black list.

If it is not certain whether the connected memory device 13 can be supported by the apparatus 11, the testing unit 202 conducts an automatic test to see whether the memory device 13 can be used with the apparatus 11.

If the connected memory device 13 cannot be used with the apparatus 11, the presenting unit 203 causes a display unit (not shown) included in the apparatus 11 to display the indication that the memory device 13 cannot be used with the apparatus 11. If it is not certain whether the connected memory device 13 can be used with the apparatus 11, the presenting unit 203 causes the display unit to display an indication to cause the user to select that an automatic test be conducted.

The storage unit 204 stores the result of the automatic test in the HDD 5. The transmitting unit 205 transmits the result of the automatic test to the server 12 connected to the network. The receiving unit 206 receives the update notification that the three lists have been updated from the server 12. The updating unit 207 updates all or some of the three lists stored in the apparatus 11 in accordance with the update notification received from the server 12.

The server 12 includes a receiving unit 211, an updating unit 212, and a notifying unit 213.

The receiving unit 211 receives the result of the automatic test from the apparatus 11. The updating unit 212 autonomously determines the result of the automatic test received from the apparatus 11 and then updates all or some of the three lists stored on the server 12. After the updating unit 212 updates the lists stored on the server 12, the notifying unit 213 transmits the update notification that the lists have been updated to the apparatus 11 connected to the network.

A white list 221, a gray list 222, a black list 223, and an automatic-test item 224 are stored in the HDD 5 of the apparatus 11. A white list 231, a gray list 232, a black list 233, and an automatic-test item 234 are stored in the HDD 5 of the server 12.

The white list contains memory devices (recommended devices) that can be definitely operated with the apparatus 11.

The gray list contains memory devices for which it is not certain whether the memory devices can be definitely operated with the apparatus 11. If it is not certain whether the memory device can be definitely operated with the apparatus 11, it means that although some records of successful operations of the memory device are stored, the number of records of successful operations is not enough to determine whether the memory device is a recommended device.

The black list contains memory devices that cannot be definitely operated with the apparatus 11 or that can adversely affect the apparatus 11.

A memory device ID for uniquely identifying a corresponding memory device is stored in each of the lists.

The automatic-test item contains items of the automatic test that is conducted if necessary when a memory device is connected to the apparatus 11 and codes (scripts and operation codes) to conduct the automatic test using the items. The automatic-test item will be explained in detail later.

The three lists and the automatic-test item are always stored in both the apparatus 11 and the server 12 and default values are stored at the time of manufacture of the apparatus 11 and the server 12. Communication is performed between the apparatus 11 and the server 12 to synchronize data when the apparatus 11 is started up or when the three lists and the automatic-test item are updated by the server 12. In order to simplify explanations in the following descriptions, all or some of the three lists are simply referred to as a "list".

Figure 3:
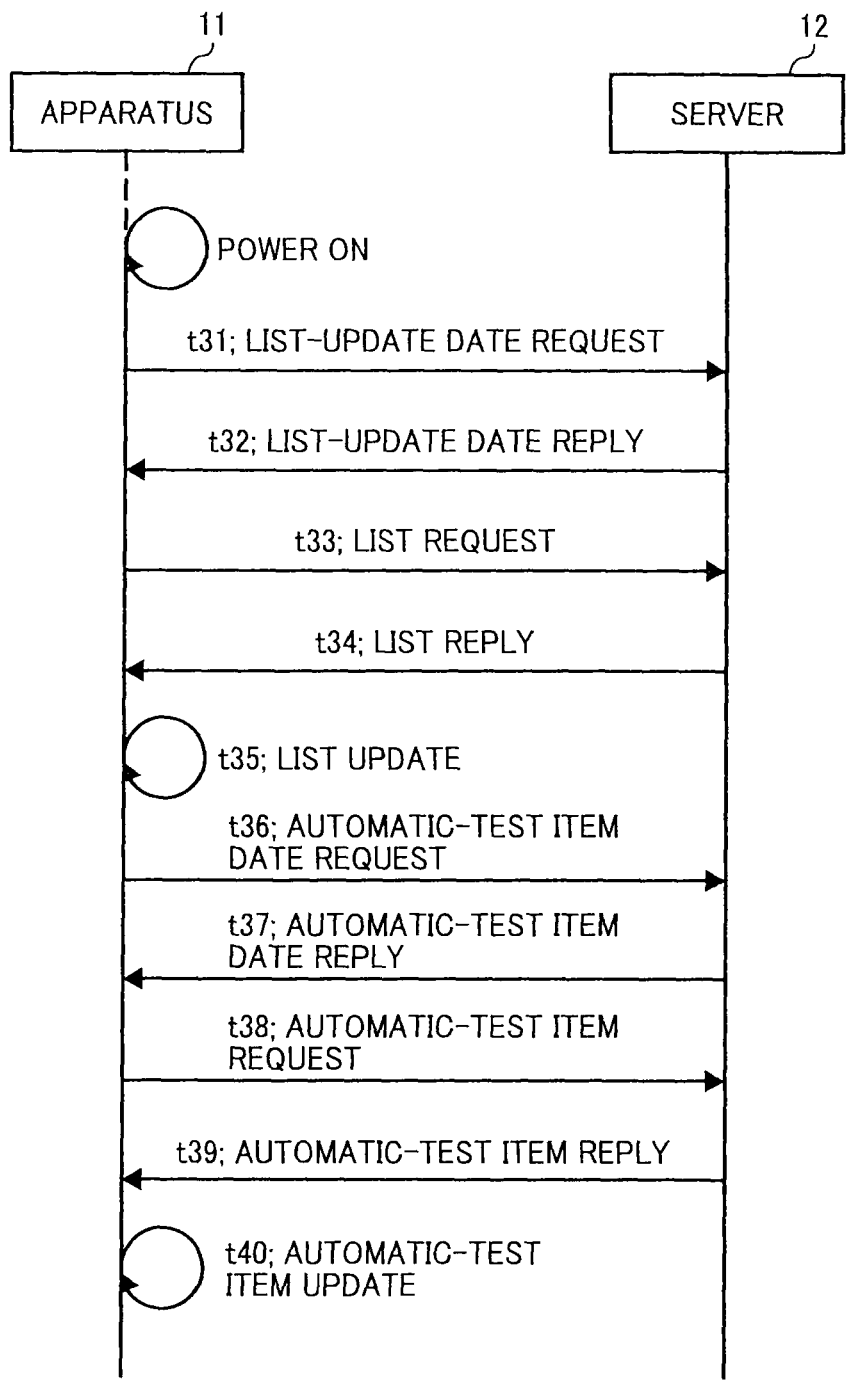
FIG. 3 is a sequence diagram that illustrates communication between the apparatus and the server when a list is updated at the time of startup of the apparatus.

FIG. 3 is a sequence diagram that illustrates the communication between the apparatus 11 and the server 12 when the list is updated at the time of startup of the apparatus 11.

When the power of the apparatus 11 is turned on, the apparatus 11 transmits a list-update date request to the server 12 (t31).

Upon receiving the list-update date request from the apparatus 11, the server 12 transmits a list-update date reply to the apparatus 11 in order to notify the apparatus 11 of the date of the list update performed by the server 12 (t32).

Upon receiving the list-update date reply from the server 12, the apparatus 11 compares the date of the list update stored in the apparatus 11 with the date of the list update indicated by the list-update date reply. If the date of the list update stored in the apparatus 11 is earlier than the date of the list update stored on the server 12, the apparatus 11 transmits a list request to the server 12 in order to request the list updated by the server 12 (t33).

Upon receiving the list request from the apparatus 11, the server 12 transmits a list reply to the apparatus 11 in order to notify the contents of the list updated by the server 12 (t34).

Upon receiving the list reply from the server 12, the apparatus 11 updates the contents of the list stored in the apparatus 11 (t35).

The process from t31 to t35 is performed on each of the white list, the gray list, and the black list.

After the process for updating the list is completed, the apparatus 11 transmits an automatic-test item date request to the server 12 to synchronize the automatic-test item between the apparatus 11 and the server 12 (t36).

Upon receiving the automatic-test item date request from the apparatus 11, the server 12 transmits an automatic-test item date reply to the apparatus 11 in order to notify the apparatus 11 of the update date of the automatic-test item updated by the server 12 (t37).

Upon receiving the automatic-test item date reply from the server 12, the apparatus 11 compares the update date of the automatic-test item stored in the apparatus 11 with the update date of the automatic-test item indicated by the automatic-test item date reply. If the update date of the automatic-test item stored in the apparatus 11 is earlier than the update date of the automatic-test item stored on the server 12, the apparatus 11 transmits an automatic-test item request to the server 12 thereby requesting the contents of the automatic-test item updated by the server 12 (t38).

Upon receiving the automatic-test item request from the apparatus 11, the server 12 transmits an automatic-test item reply to the apparatus 11 to notify the apparatus 11 of the contents of the automatic-test item updated by the server 12 (t39).

Upon receiving the automatic-test item reply from the server 12, the apparatus 11 updates the contents of the automatic-test item stored in the apparatus 11 (t40).

Figure 4:
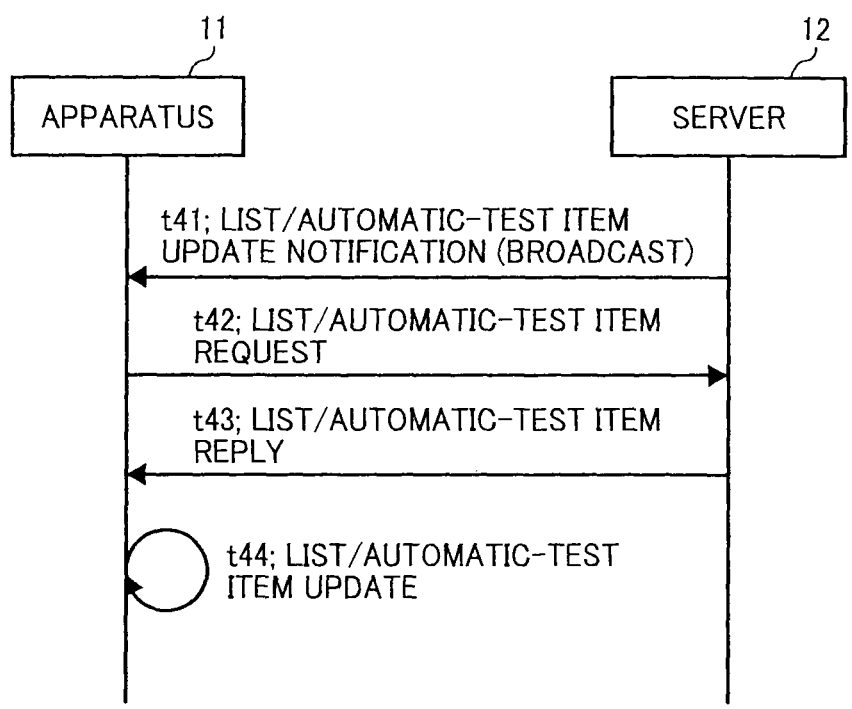
FIG. 4 is a sequence diagram that illustrates the communication between the apparatus and the server when the server has updated any of a white list, a gray list, a black list, and an automatic-test item.

FIG. 4 is a sequence diagram that illustrates the communication between the apparatus 11 and the server 12 when the server 12 has updated any of the white list, the gray list, the black list, and the automatic-test item.

The reason why the update is performed by the server 12 will be explained later.

When the server 12 has updated the list/automatic-test item, the server 12 broadcasts a list/automatic-test item update notification to the apparatus 11 (t41).

Upon receiving the list/automatic-test item update notification from the server 12, the apparatus 11 that has been started up transmits a list/automatic-test item request to the server 12 (t42).

Upon receiving the list/automatic-test item request from the apparatus 11, the server 12 transmits a list/automatic-test item reply to the apparatus 11 to notify the apparatus 11 of the contents of the updated list/automatic-test item (t43).

Upon receiving the list/automatic-test item reply from the server 12, the apparatus 11 updates the contents of the list/automatic-test item in accordance with information indicated by the list/automatic-test item reply (t44).

The process from t42 to t44 is performed only on the list or the automatic-test item for which the update notification is received. The apparatus 11 transmits the list-update date request and the automatic-test item date request to the server 12, as described with reference to FIG. 3. However, in the synchronization process performed immediately after the server 12 has updated the list or the automatic-test item as described with reference to FIG. 4, because it is obvious that the updated list or automatic-test item is the latest, the apparatus 11 does not transmit the list-update date request and the automatic-test item date request to the server 12.

If the apparatus 11 has not been started up, the synchronization process cannot be performed. When the apparatus 11 is started up, the synchronization process is performed as described with reference to FIG. 3.

Figure 5:
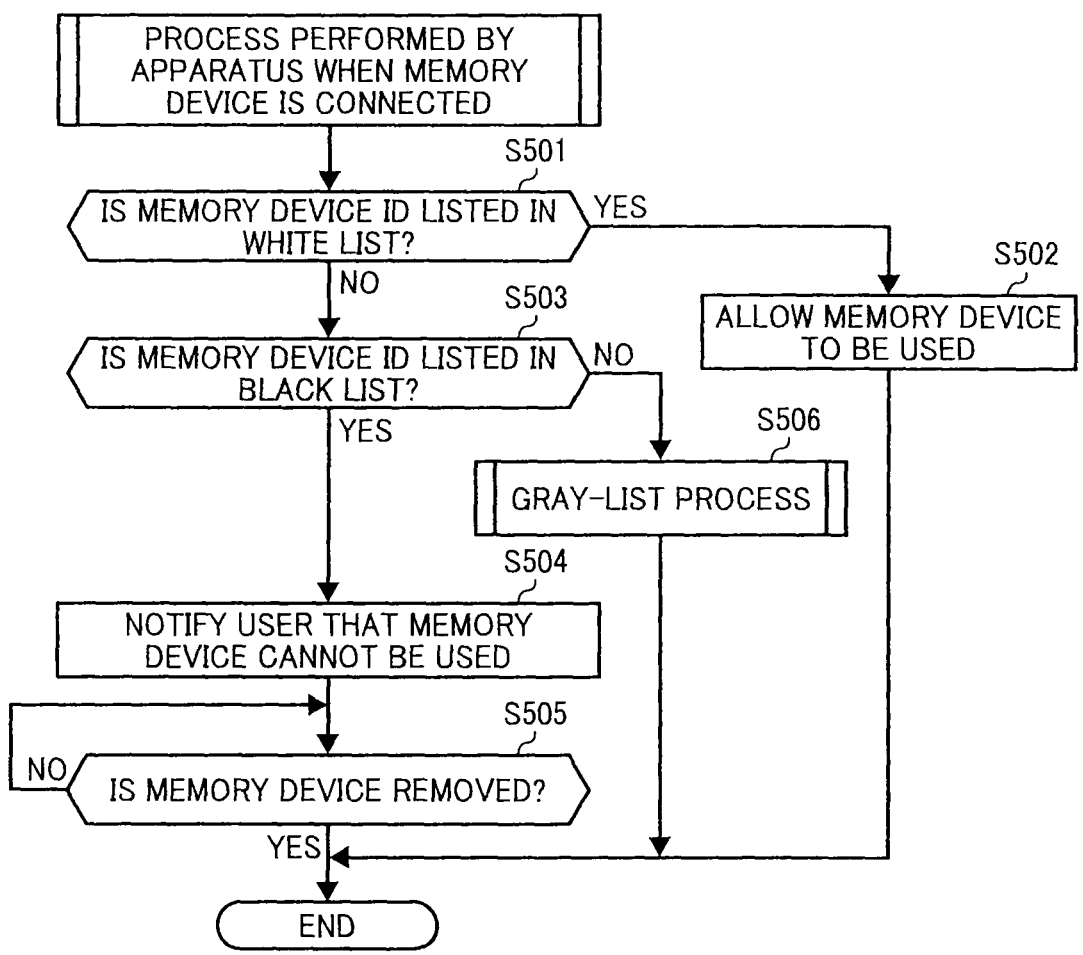
FIG. 5 is a flowchart of a process performed when a memory device shown in FIG. 1A is connected to the apparatus.

FIG. 5 is a flowchart of the process performed when the memory device 13 is connected to the apparatus 11.

When the memory device 13 is connected to the apparatus 11, the apparatus 11 acquires the memory device ID from the memory device 13 and then determines whether the memory device ID is listed in the white list (Step S501).

If it is determined that the memory device ID is listed in the white list (Yes at Step S501), the apparatus 11 determines that the memory device 13 can be used with the apparatus 11 without condition and then allows the user to use the memory device 13 in order to use the functions of the apparatus 11 (Step S502). Then, the process shown in FIG. 5 ends.

If it is determined that the memory device ID is not listed in the white list (No at Step S501), the apparatus 11 determines whether the memory device ID is listed in the black list (Step S503).

If it is determined that the memory device ID is listed in the black list (Yes at Step S503), the apparatus 11 displays the indication "this memory device cannot be used" on a liquid crystal display (LCD) panel included in the apparatus 11 and does not allow the user to use the memory device 13 (Step S504).

After the user removes the memory device 13 from the apparatus 11 (Yes at Step S505), the process shown in FIG. 5 ends.

If it is determined that the memory device ID is not listed in the black list (No at Step S503), a gray-list process is performed (Step S506). The gray-list process will be explained later.

As described above, when the memory device 13 is connected to the apparatus 11, the apparatus 11 is operated in a different manner depending on the list in which the memory device ID of the memory device 13 is listed.

Figure 6:
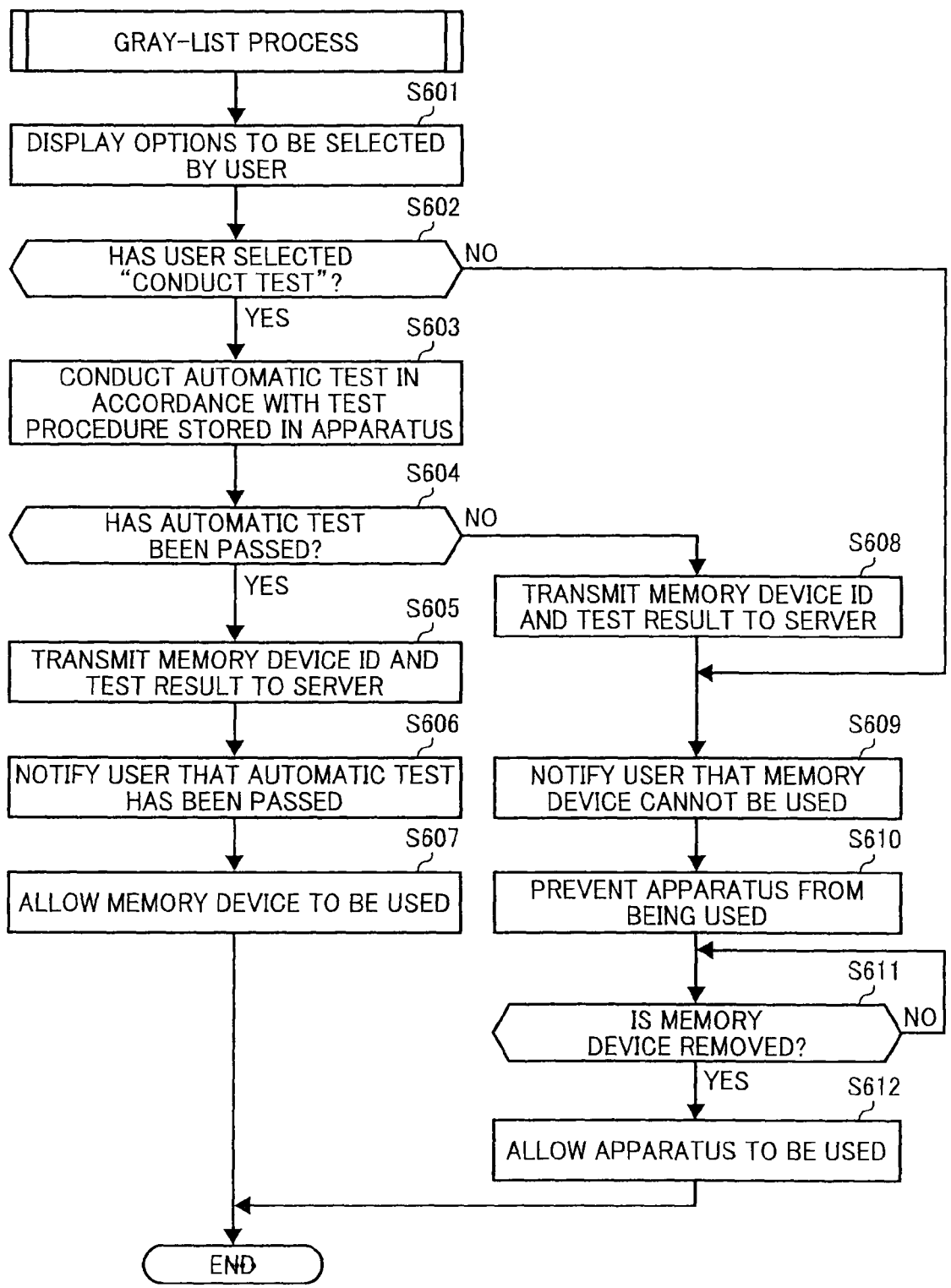
FIG. 6 is a flowchart of a gray-list process.

FIG. 6 is a flowchart of the gray-list process. If the memory device ID of the memory device 13 is listed in the gray list, the user is notified of the following two points: the memory device 13 connected to the apparatus 11 is not recommended for use with the apparatus 11; and if the user desires to use the memory device 13 connected to the apparatus 11, it is necessary to conduct a test to see whether the memory device 13 can be used with the apparatus 11. The LCD panel then displays the indications "conduct the test to see whether the memory device can be used" and "stop using the memory device with the apparatus", so that the user can select any one of the options indicated (Step S601).

If it is determined that the user has selected "conduct the test" (Yes at Step S602), the apparatus 11 conducts the automatic test in accordance with a predetermined test procedure stored in the apparatus 11 (Step S603). Thus, the apparatus 11 checks whether the memory device 13 connected to the apparatus 11 can be correctly operated.

If the automatic test has been passed (Yes at Step S604), the apparatus 11 transmits the memory device ID and the test result (a result indicating the automatic test has been passed) to the server 12 (Step S605). The LCD panel then displays the indication that the automatic test has been passed so that the user is notified of the indication (Step S606). The apparatus 11 then allows the user to use the memory device 13 in order to use the functions of the apparatus 11 (Step S607).

If an error is detected in the automatic test (No at Step S604), the apparatus 11 transmits the memory device ID and a test result (a result indicating the automatic test has been failed) to the server 12 (Step S608). The LCD panel then displays the indications "the automatic test has been failed" and "the memory device needs to be removed from the apparatus" so that the user is notified of the indications (Step S609). The apparatus 11 then does not allow the user to use the apparatus 11 (Step S610) until the user removes the memory device 13 from the apparatus 11.

When the memory device 13 is removed from the apparatus 11 (Yes at Step S611), the apparatus 11 allows the user to use the apparatus 11 again (Step S612).

If it is determined that the user has selected "stop using the memory device" (No at Step S602), the LCD panel displays the indication "the connected memory device cannot be used with the apparatus because it is not certain whether the memory device can be used" so that the user is notified of the indication. Then, the process from Step S609 to S612 is performed, and the user is not allowed to use the apparatus 11 until the memory device 13 is removed from the apparatus 11.

The gray-list process is performed if the memory device ID of the memory device 13 is listed in the gray list. Even if the memory device ID is not listed in the gray list (in such a case, the memory device ID is not listed in any of the three lists), the gray-list process is performed in the same manner as if the memory device ID is listed in the gray list.

Figure 7:
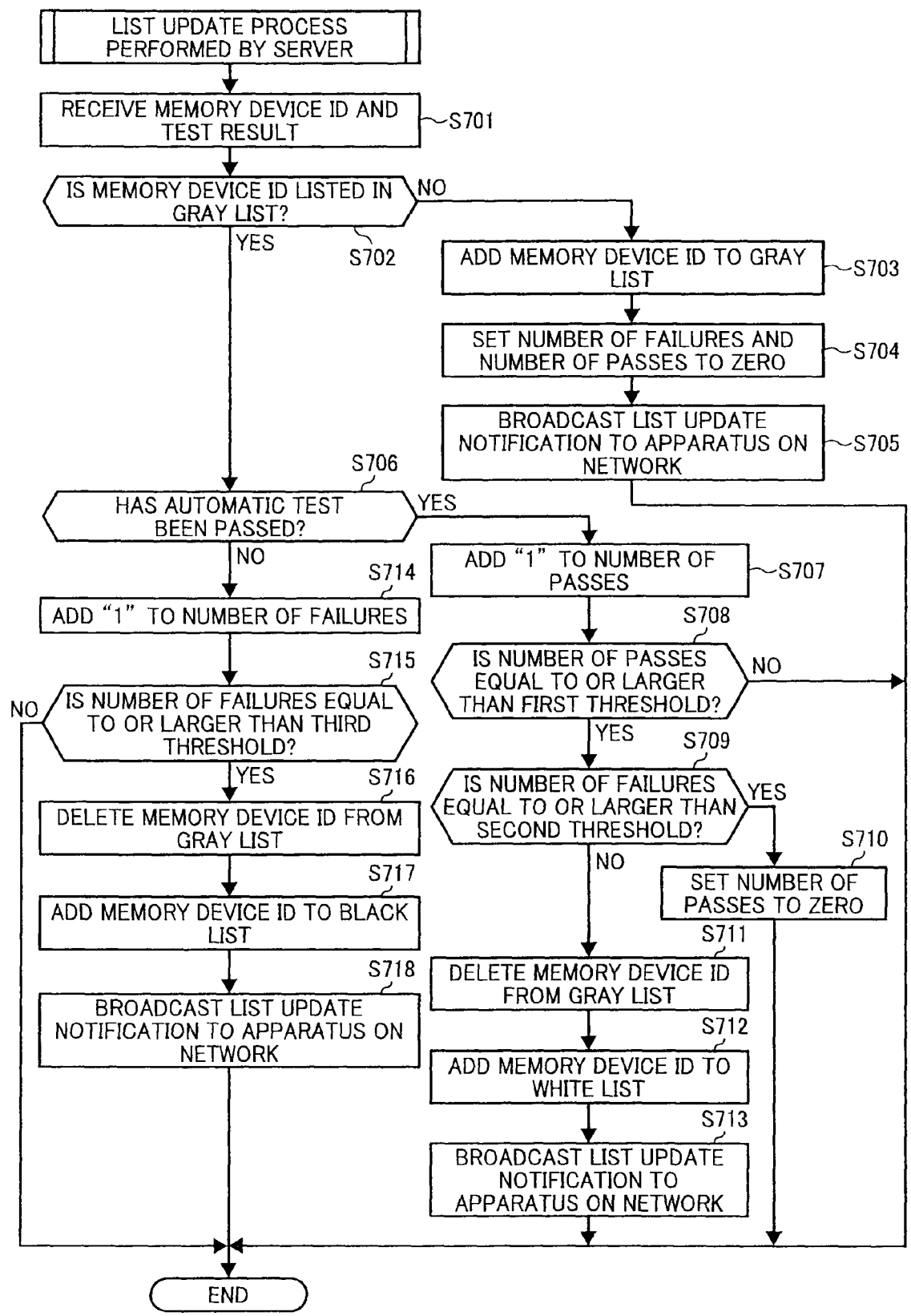
FIG. 7 is a flowchart of a list update process performed by the server.

FIG. 7 is a flowchart of the list update process performed by the server 12.

As described with reference to FIG. 6, in some cases, the apparatus 11 conducts the automatic test when the memory device is connected to the apparatus 11. If the apparatus 11 has conducted the automatic test, the apparatus 11 transmits a test result to the server 12. The server 12 performs a process in accordance with the received test result as described below.

Three thresholds described below are preliminarily stored on the server 12 in order to perform the list update process.

The number of test passes by the memory device is counted in accordance with test results received by the server 12, and if the accumulated number of passes is equal to or more than a first threshold, the memory device ID of the memory device is moved from the gray list or the black list to the white list in principle, and the gray list or the black list and the white list are updated.

The number of test failures by the memory device is counted in accordance with test results received by the server 12. Even though the number of test passes is equal to or more than the first threshold, if the number of test failures is equal to or more than a second threshold, the memory device ID is not moved to the white list. The reason why the second threshold is stored on the server 12 is that, if some memory devices are often defective, the memory devices are likely to accumulate a large number of test passes and test failures; therefore, the memory devices are not allowed to be listed in the white list. To prevent such a memory device from being listed in the white list, the second threshold is stored on the server 12.

If the number of test failures is equal to or more than a third threshold, the memory device ID is moved from the white list or the gray list to the black list in principle, and the white list or the gray list and the black list are updated.

The server 12 receives the memory device ID and the test result from the apparatus 11 in the gray-list process (Step S701).

The server 12 then determines whether the received memory device ID is listed in the gray list (Step S702).

If it is determined that the memory device ID is not listed in the gray list (No at Step S702), the process control proceeds to Step S703.

The server 12 adds the memory device ID to the gray list (Step S703) and sets the number of failures and the number of passes to zero (Step S704). The number of failures and the number of passes are used as counters.

Because the server 12 has updated the gray list at Step S703, the server 12 broadcasts a list update notification to an apparatus connected to the network (Step S705).

If it is determined that the memory device ID is listed in the gray list (Yes at Step S702), the server 12 determines whether the automatic test has been passed using the received test result (Step S706).

If it is determined that the automatic test has been passed (Yes at Step S706), the server 12 adds "1" to the number of passes (Step S707).

The server 12 then determines whether the number of passes is equal to or more than the first threshold (Step S708). If it is determined that the number of passes is less than the first threshold (No at Step S708), the process shown in FIG. 7 ends.

If it is determined that the number of passes is equal to or more than the first threshold (Yes at Step S708), the server 12 determines whether the number of failures is equal to or more than the second threshold (Step S709).

If it is determined that the number of failures is equal to or more than the second threshold (Yes at Step S709), the server 12 sets the number of passes to zero (Step S710), and then the process shown in FIG. 7 ends.

If it is determined that the number of failures is less than the second threshold (No at Step S709), the process control proceeds to Step S711.

The server 12 deletes the memory device ID received at Step S701 from the gray list (Step S711) and adds the memory device ID to the white list (Step S712).

Because the server 12 has updated the gray list at Step S711 and the white list at Step S712, the server 12 broadcasts a list update notification to an apparatus connected to the network (Step S713), and then the process shown in FIG. 7 ends.

If it is determined that the automatic test has been failed (No at Step S706), the server 12 adds "1" to the number of failures (Step S714).

Then, the server 12 determines whether the number of failures is equal to or more than the third threshold (Step S715). If it is determined that the number of failures is less than the third threshold (No at Step S715), the process shown in FIG. 7 ends.

Conversely, if it is determined that the number of failures is equal to or more than the third threshold (Yes at Step S715), the process control proceeds to Step S716.

The server 12 deletes the memory device ID received at Step S701 from the gray list (Step S716) and adds the memory device ID to the black list (Step S717).

Because the server 12 has updated the gray list at Step S716 and the black list at Step S717, the server 12 broadcasts a list update notification to an apparatus connected to the network (Step S718), and then the process shown in FIG. 7 ends.

As described above, if the number of passes of the automatic test for the memory device is equal to or more than the first threshold, the memory device ID of the memory device is moved to the white list. However, if the number of failures of the automatic test is equal to or more than the second threshold, the number of passes is set to zero, and the memory device ID is kept on the gray list. If the number of failures is equal to or more than the third threshold, the memory device ID is moved to the black list. If the list has been updated according to the above conditions, as shown in FIG. 4, the server 12 broadcasts the list update notification to an apparatus and, in accordance with a request received from an apparatus that has been started up, transmits a reply to the apparatus to notify the contents of the updated list.

Figure 8:
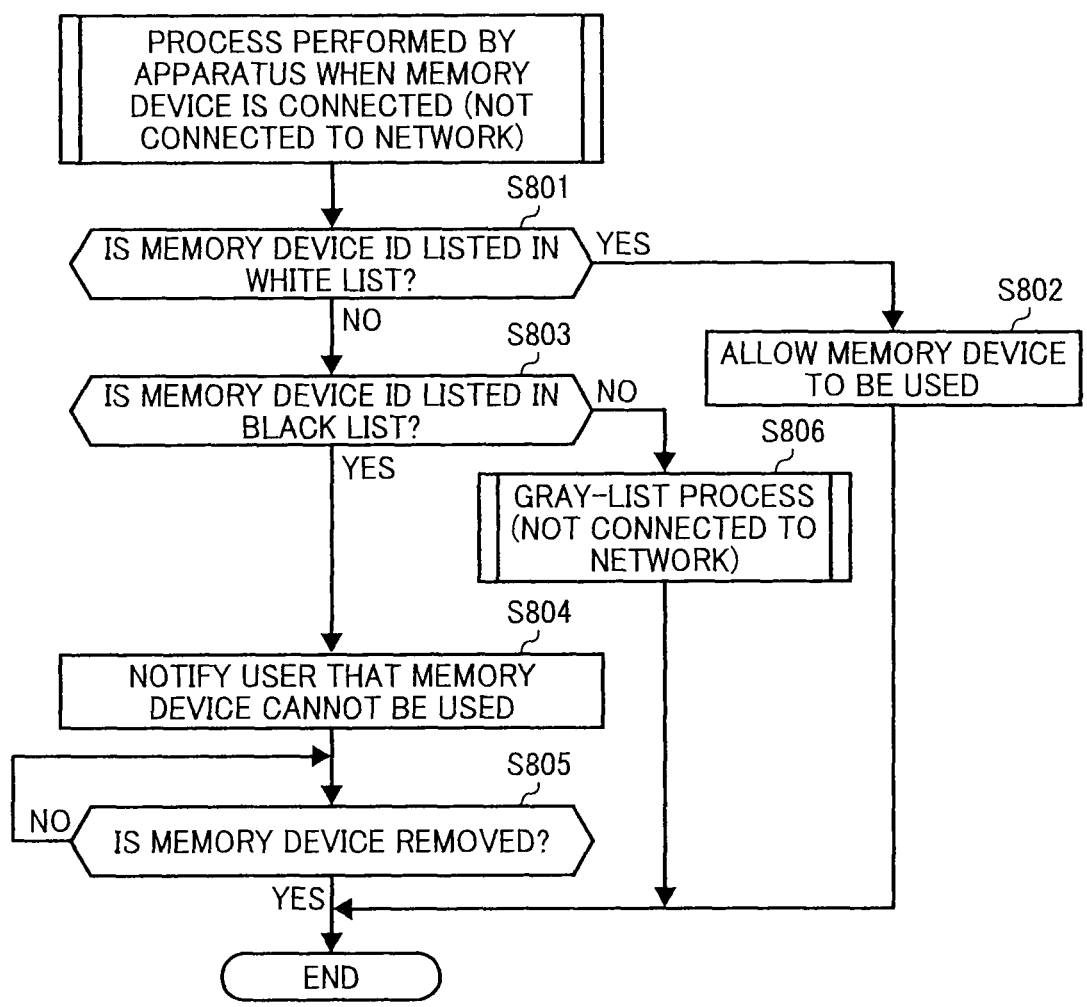
FIG. 8 is a flowchart of a process performed when the memory device is connected to the apparatus while the apparatus is not connected to a network.
Figure 9:
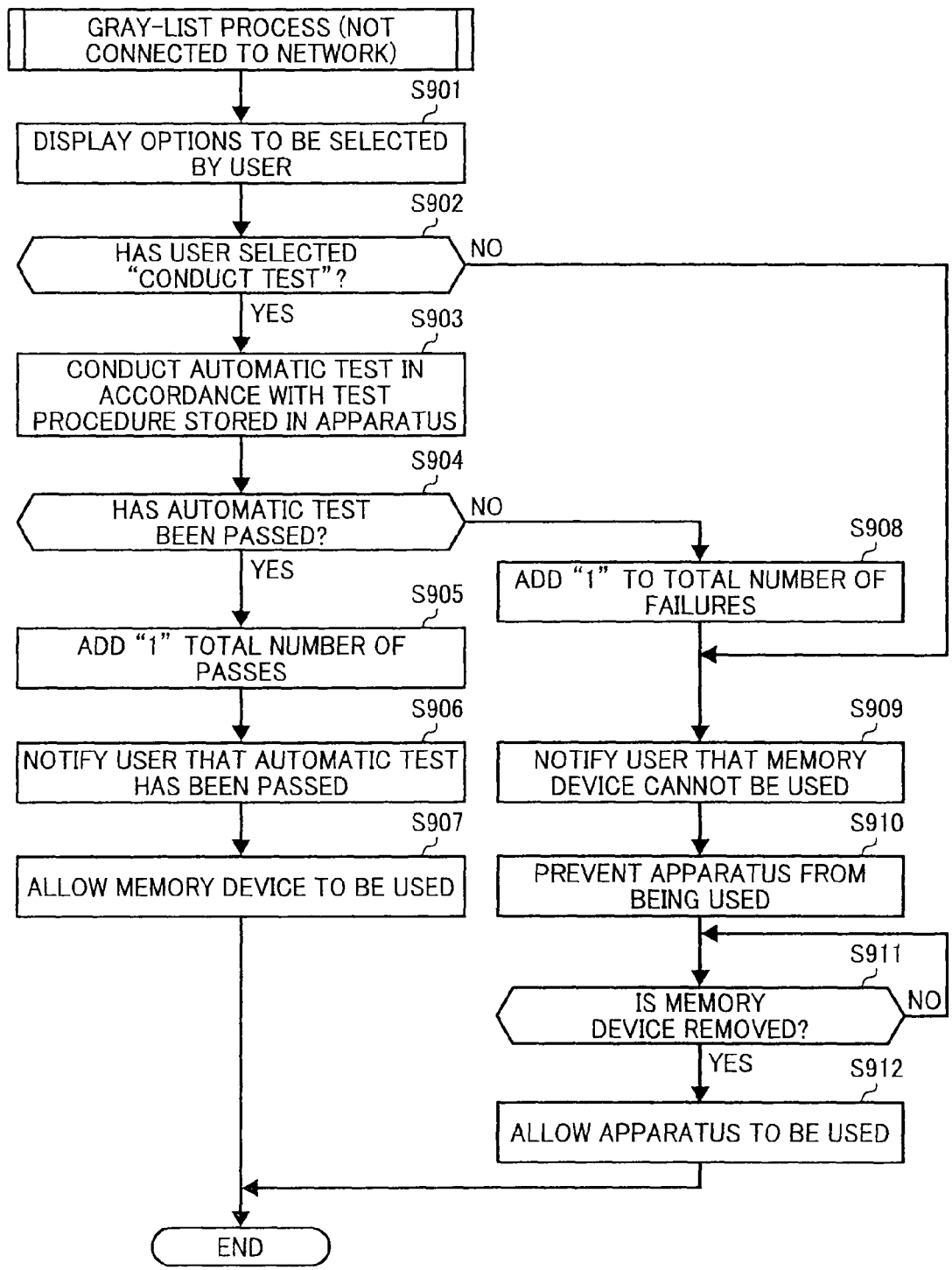
FIG. 9 is a flowchart of a gray-list process shown in FIG. 8.

FIG. 8 is a flowchart of a process performed when the memory device 13 is connected to the apparatus 11 while the apparatus 11 is not connected to the network. FIG. 9 is a flowchart of the gray-list process shown in FIG. 8.

In the above descriptions, it is assumed that the apparatus 11 can be connected to the server 12. If the apparatus 11 cannot be connected to the network or if the apparatus 11 cannot be connected to the server 12 due to a network failure, or the like, the process described below is performed.

The process shown in FIG. 8 is substantially the same as the process shown in FIG. 5. Only the gray-list process (Step S506 shown in FIG. 5 and Step S806 shown in FIG. 8) is different. Therefore, the explanations for the same parts except for the gray-list process will be omitted.

First, the user is notified of the following two points: the memory device 13 connected to the apparatus 11 is not recommended for use with the apparatus 11; and if the user desires to use the memory device 13, it is necessary to conduct a test to see whether the memory device 13 can be used with the apparatus 11. The LCD panel then displays the indications "conduct the test to see whether the memory device can be used" and "stop using the memory device with the apparatus" so that the user can select any one of the options indicated (Step S901).

If it is determined that the user has selected "conduct the test" (Yes at Step S902), the apparatus 11 conducts the automatic test in accordance with a predetermined test procedure stored in the apparatus 11 (Step S903). Thus, the apparatus 11 checks whether the memory device 13 connected to the apparatus 11 can be correctly operated.

If the automatic test has been passed (Yes at Step S904), the apparatus 11 adds "1" to the total number of passes stored in the apparatus 11 (Step S905). The LCD panel then displays the indication that the automatic test has been passed so that the user is notified of the indication (Step S906). The apparatus 11 then allows the user to use the memory device 13 in order to use the functions of the apparatus 11 (Step S907).

If an error is detected in the automatic test (No at Step S904), the apparatus 11 adds "1" to the total number of failures stored in the apparatus 11 (Step S908). The LCD panel then displays the indications that "the automatic test has been failed" and "the connected memory device needs to be removed from the apparatus" so that the user is notified of the indications (Step S909). The apparatus 11 then does not allow the user to use the apparatus 11 (Step S910) until the user removes the memory device 13 is removed from the apparatus 11.

When the memory device 13 is removed from the apparatus 11 (Yes at Step S911), the apparatus 11 allows the user to use the apparatus 11 again (Step S912).

If it is determined that the user has selected "stop using the memory device" (No at Step S902), the LCD panel displays the indication "the connected memory device cannot be used with the apparatus because it is not certain whether the memory device can be used" so that the user is notified of the indication. Then, the process from Step S909 to S912 is performed, and the user is not allowed to use the apparatus 11 until the memory device 13 is removed from the apparatus 11.

The gray-list process is performed if the memory device ID of the memory device 13 is listed in the gray list. Even if the memory device ID is not listed in the gray list (in such a case, the memory device ID is not listed in any of the three lists), the gray-list process is performed in the same manner as if the memory device ID is listed in the gray list.

Even if a specific memory device accumulates a large number of test passes and failures, a local list stored in the apparatus 11 is not updated.

The reasons why the local list stored in the apparatus 11 is not updated are as follows: it is better to define the list on the basis of whether the memory device is recommended by the manufacturer and it is better not to define the list only in terms of performances of the memory device under the environment of a specific apparatus; and it is necessary to avoid data mismatching caused by the list update after the apparatus is connected to the network again.

It is assumed that the local list stored in the apparatus 11 is updated. In the local list, if the memory device 13 has accumulated a certain number of test passes, the memory device ID of the memory device 13 is moved from the gray list to the white list. However, if the list stored on the server 12 is updated, the local list stored in the apparatus 11 is overwritten with the list stored on the server 12; therefore, the number of test passes stored in the local list is deleted. As a result, there is a possibility that the memory device 13 that has been used by the user is suddenly treated as an unrecommended device. To prevent such a problem, the local list is not updated.

Figure 10:
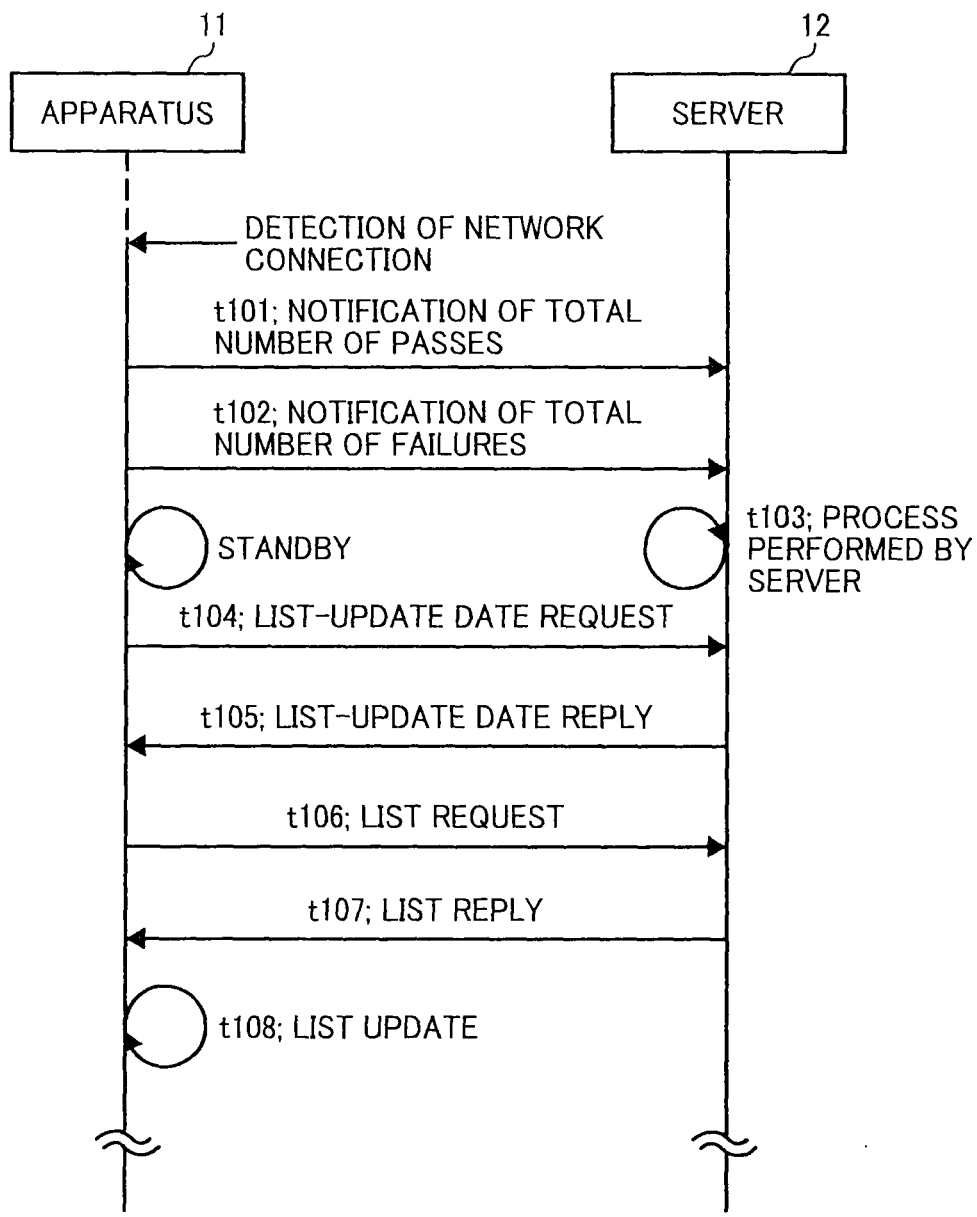
FIG. 10 is a sequence diagram that illustrates the communication between the apparatus and the server upon list/automatic-test item update when the apparatus is connected to the network again.

FIG. 10 is a sequence diagram that illustrates the communication between the apparatus 11 and the server 12 upon the list/automatic-test item update when the apparatus 11 is connected to the network again.

When the apparatus 11 is connected to the network, the apparatus 11 notifies the server 12 of the memory device ID (not shown in FIG. 10) and the total number of passes as the test result shown in FIG. 7 (t101). The apparatus 11 then notifies the server 12 of the total number of failures (t102).

The server 12 adds the total number of passes received from the apparatus 11 to the number of passes described in the list update process shown in FIG. 7 and adds the total number of failures received from the apparatus 11 to the number of failures described in the list update process shown in FIG. 7.

The server 12 then performs the list update process (the process from Step S702 to S718 shown in FIG. 7) (t103). At that time, the apparatus 11 stands by for a predetermined time. The reason why the apparatus 11 stands by during the list update process performed by the server 12 is that there is a possibility that the list stored on the server 12 is updated in accordance with the notification of the total number of passes and the total number of failures.

If any of the lists have been updated by the server 12 in the list update process at t103, the synchronization process is performed to synchronize the lists stored in the apparatus 11 and the server 12 as shown in FIG. 4.

Conversely, if none of the lists have been updated by the server 12 in the list update process at t103, the synchronization process is performed to synchronize the lists stored in the apparatus 11 and the server 12 in the sequence after t104. Because the sequence after t104 is the same as that from t31 to t40 shown in FIG. 3, detailed explanation will be omitted.

Figure 11:
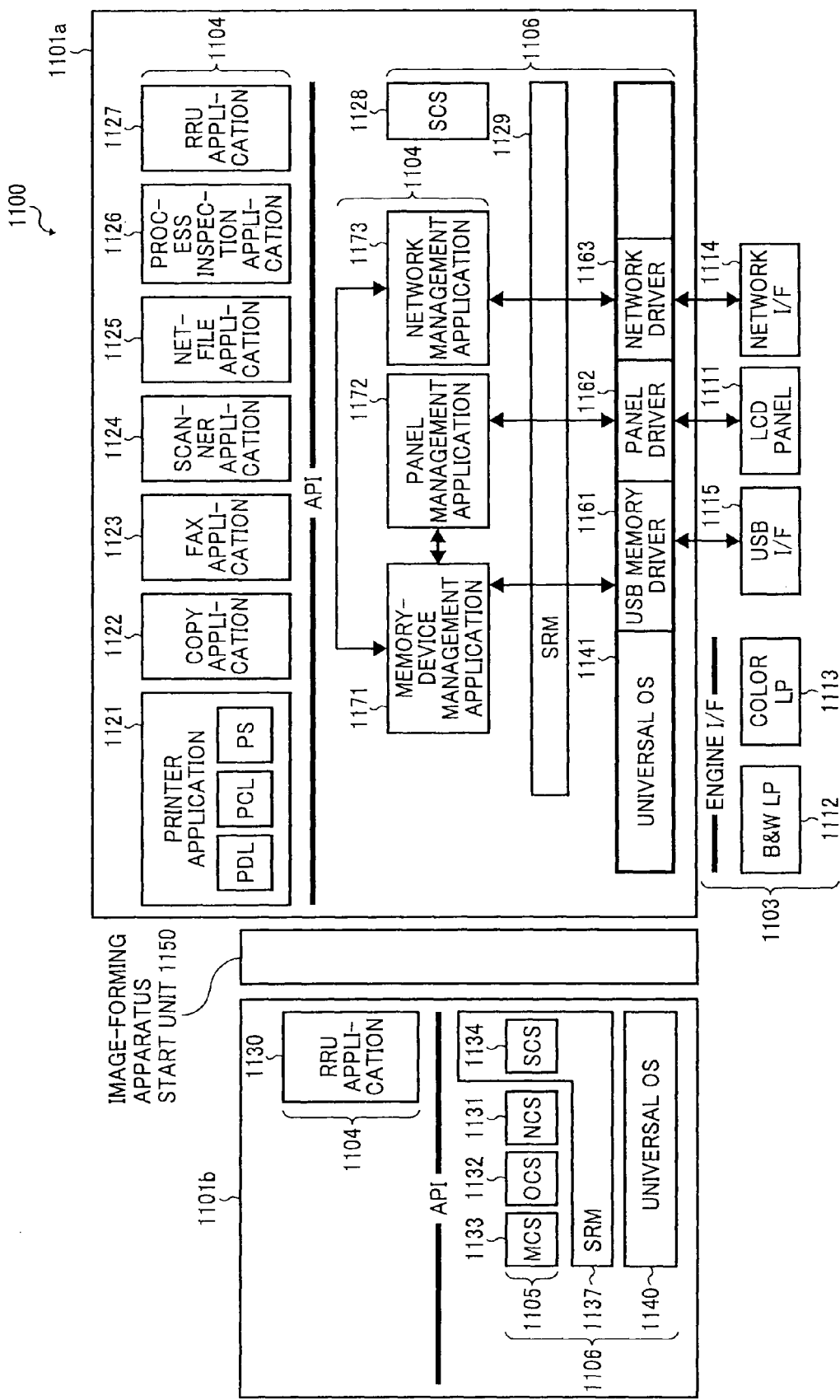
FIG. 11 is a block diagram of an image forming apparatus that is used as the apparatus.
Figures 12, 13:
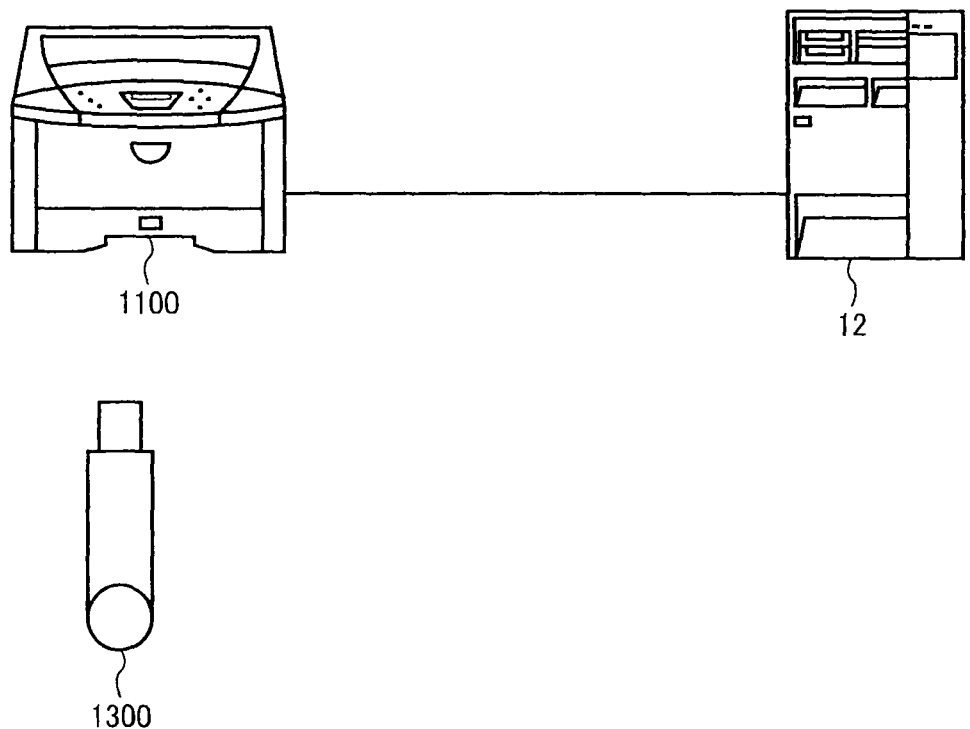
FIG. 12 is a schematic diagram of the overall configuration of the embodiment.
FIG. 13 is a diagram that illustrates the format of communication data transmitted using the TCP.

FIG. 11 is a block diagram of an image forming apparatus 1100 that is used as the apparatus 11. FIG. 12 is a schematic diagram of the overall configuration of the embodiment.

As shown in FIG. 12, the image forming apparatus 1100, the server 12, and a USB memory 1300 as a general memory device are provided according to the embodiment.

The USB memory 1300 is connectable to the image forming apparatus 1100. The image forming apparatus 1100 has functions of writing image data, and the like, to the USB memory 1300 connected to the image forming apparatus 1100, and of performing the list synchronization process and the automatic test. These functions can be performed by using a memory-device management application 1171, a USB memory driver 1161, a USB I/F 1115, a panel management application 1172, a panel driver 1162, an LCD panel 1111, a network management application 1173, a network driver 1163, and a network I/F 1114, as shown in FIG. 11.

The image forming apparatus 1100 includes software groups 1101a and 1101b that function as a control unit, an image-forming apparatus start unit 1150, and hardware resources 1103.

The image-forming apparatus start unit 1150 is primarily operated upon the power-on of the image forming apparatus 1100, and the image-forming apparatus start unit 1150 runs an application layer 1104 and a platform 1106.

The hardware resources 1103 include a black-and-white laser printer (B&W LP) 1112, a color laser printer (color LP) 1113, the network I/F 1114, the USB I/F 1115, and the LCD panel 1111 that functions as a display unit and an operation unit.

The software group 1101a includes the application layer 1104 that is run on a universal operating system (OS) 1141, such as UNIX (registered trademark), and the platform 1106 that includes the universal OS 1141.

The application layer 1104 included in the software group 1101a is an application program that performs specific processes for functions relating to image forming operations of a printer, copier, a facsimile machine, a scanner, and the like, and additional functions. The application layer 1104 includes a printer application 1121 for a printer, a copy application 1122 for a copier, a fax application 1123 for a facsimile machine, a scanner application 1124 for a scanner, a net-file application 1125 for a network file, a process inspection application 1126 for inspecting processes, a Remote ROM Update (RRU) application 1127 for performing an RRU, the memory-device management application 1171, the panel management application 1172, and the network management application 1173. The memory-device management application 1171 manages a USB memory connected to the image forming apparatus 1100. The panel management application 1172 controls the display of the LCD panel 1111 and the input from the LCD panel 1111 in cooperation with processes of the memory-device management application 1171. The network management application 1173 controls communication with the server 12 connected to the network in cooperation with processes of the memory-device management application 1171.

The platform 1106 of the software group 1101a includes a system control service (SCS) 1128, a system resource manager (SRM) 1129, and the universal OS 1141. The SCS 1128 and the SRM 1129 have the same functions as an SCS 1134 and an SRM 1137 described below. The universal OS 1141 includes various drivers, such as the USB memory driver 1161, the panel driver 1162, and the network driver 1163. Thus, the image forming apparatus 1100 can control communication I/Fs such as the network I/F 1114 and the USB I/F 1115. The image forming apparatus 1100 is connected to an external device via such a communication I/F so that the image forming apparatus 1100 can input and output communication data to and from the external device.

The memory-device management application 1171 is used for the list synchronization process and the automatic test performed by the apparatus 11. The panel management application 1172 controls the display of the LCD panel 1111 and operations input by the user via the LCD panel 1111, as described later with reference to FIGS. 15, 16, 19, 21, and 23, in cooperation with an operation panel control service (OCS) 1132. The network management application 1173 controls the communication with the server 12 in cooperation with a network control service (NCS) 1131. The contents of the communication performed by the network management application 1173 are the same as those described with reference to FIGS. 3, 4, and 10.

The software group 1101b includes the platform 1106 that is run on a universal OS 1140 such as UNIX (registered trademark) and an RRU application 1130 that is run on the platform 1106. The RRU application 1130 is an application for performing the RRU in the same manner as the RRU application 1127. The platform 1106 of the software group 1101b includes a control service layer 1105, the SRM 1137, and the universal OS 1140. The control service layer 1105 interprets a processing request received from the application layer 1104 and generates an acquisition request for the hardware resources 1103. The SRM 1137 manages the one or more hardware resources 1103 and arbitrates the acquisition request received from the control service layer 1105. The universal OS 1140 manages the hardware resources 1103 in accordance with the acquisition request received from the SRM 1137.

The control service layer 1105 includes the NCS 1131, the OCS 1132, a memory control service (MCS) 1133, and the SCS 1134. The control service layer 1105 includes one or more service modules.

An application program interface (API) allows the platform 1106 to receive processing requests from the application layer 1104 by using previously defined functions. The universal OS 1140 and the universal OS 1141 execute each software program of the application layer 1104 and the platform 1106 as a process in parallel.

Processes of the NCS 1131 are to provide services that can be commonly used in applications for which the network I/F 1114 is required. The NCS 1131 intermediates to distribute data received from the network by using each protocol for each application or to transmit data from each application to the network.

For example, the NCS 1131 controls data communication with devices connected via a network via the hypertext transfer protocol (HTTP) by using the hypertext transfer protocol daemon (httpd). Processes of the OCS 1132 are to control an operation panel as a unit that transmits information between the user and the image forming apparatus 1100.

Processes of an MCS 1135 are to control allocation and deallocation of areas of a system memory (not shown) or the use of a storage device (not shown). Processes of the SCS 1134 are to manage applications and control interrupt applications.

Processes of the SRM 1137 are to perform system control and to manage the hardware resources 1103 together with the SCS 1134. For example, processes of the SRM 1137 are to arbitrate an acquisition request received from an upper layer to use the hardware resource 1103 such as the B&W LP 1112 or the color LP 1113 and execute the hardware resources 1103. Specifically, the processes of the SRM 1137 are to determine whether the requested hardware resource 1103 is available (whether the hardware resource 1103 is not being used in accordance with a different acquisition request), and if it is determined that the hardware resource 1103 is available, notify the upper layer that the requested hardware resource 1103 is available. Processes of the SRM 1137 are to perform scheduling to use the hardware resource 1103 in accordance with an acquisition request received from the upper layer and directly perform the requested operation (for example, operations for conveying a sheet and forming images by using a printer engine (not shown), an operation for allocating an area of the system memory, or an operation for generating a file).

Because the functions of the image forming apparatus 1100 are basically the same as those of the apparatus 11, only characteristic parts of the image forming apparatus 1100 will be explained in the following descriptions.

Each of the server 12 and the image forming apparatus 1100 stores therein the three lists, i.e., the white list, the gray list, and the black list, and the automatic-test item, as described with reference to FIG. 2.

The white list contains memory devices (recommended devices) that can be definitely operated with the image forming apparatus 1100.

The gray list contains memory devices for which it is not certain whether the memory devices can be definitely operated with the image forming apparatus 1100.

The black list contains memory devices that cannot be definitely operated with the image forming apparatus 1100 or that can adversely affect the apparatus 11.

A memory device ID for uniquely identifying a corresponding memory device is stored in each of the lists.

The automatic-test item contains items of the automatic test that is conducted if necessary when a memory device is connected to the image forming apparatus 1100 and codes (scripts and operation codes) to conduct the automatic test using the items. The automatic-test item will be explained in detail later.

The three lists and the automatic-test item are always stored in both the server 12 and the image forming apparatus 1100 and default values are stored at the time of manufacture of the server 12 and the image forming apparatus 1100. Communication is performed between the server 12 and the image forming apparatus 1100 to synchronize data when the image forming apparatus 1100 is started up or when the three lists and the automatic-test item are updated by the server 12.

This communication is performed between the server 12 and the image forming apparatus 1100 by using a transmission control protocol (TCP). FIG. 13 is a diagram that illustrates the format of communication data transmitted using the TCP. A TCP header, an IP header, and an Ethernet (registered trademark) header are not shown in FIG. 13. The communication data contains the "communication ID" for identifying the contents of the communication and data parts (data 1, data 2, ..., data n). Different data parts are provided for each communication ID. In the embodiment, the format shown in FIG. 13 is used as the format for the communication data.

Because the synchronization process of the list/automatic-test item at the time of startup of the image forming apparatus 1100 is the same as that described with reference to FIG. 3, the explanations will be omitted.

FIGS. 14A to 14H are diagrams that illustrate the contents of the communication data transmitted between the image forming apparatus 1100 and the server 12 using the TCP in the synchronization process. The TCP header, the IP header, and the Ethernet (registered trademark) header are not shown in FIGS. 14A to 14H.

Figure 14A:
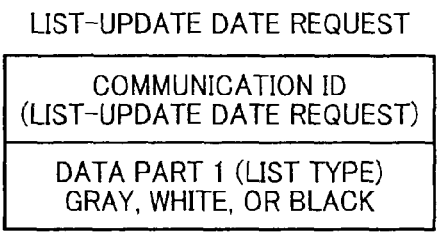
FIGS. 14A to 14H are diagrams that illustrate the contents of the communication data transmitted between the image forming apparatus and the server using the TCP in a synchronization process.

In the list-update date request shown in FIG. 14A, the ID for identifying the list-update date request is set in the communication ID, and the type (gray, white, or black) of the list is set in data part 1.

Figure 14B:
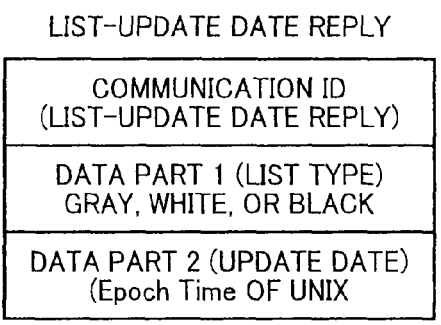

In the list-update date reply shown in FIG. 14B, the ID for identifying the list-update date replay is set in the communication ID, the type (gray, white, or black) of the list is set in the data part 1, and the update date (for example, Epoch Time of UNIX (registered mark)) is set in data part 2.

Figure 14C:
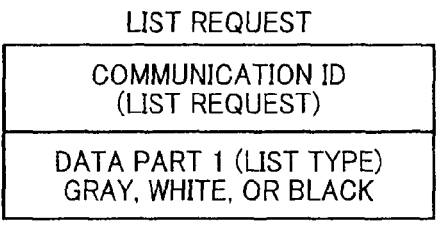

In the list request shown in FIG. 14C, the ID for identifying the list request is set in the communication ID, and the type (gray, white, or black) of the list is set in the data part 1.

Figure 14D:
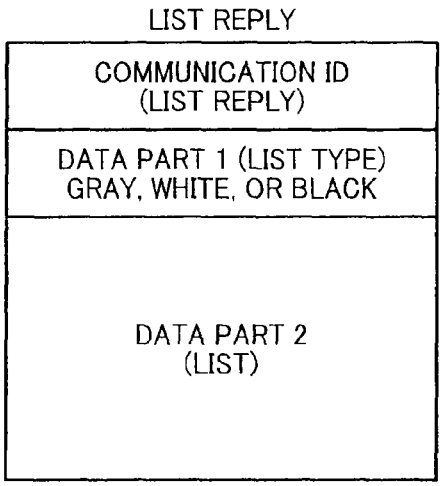

In the list reply shown in FIG. 14D, the ID for identifying the list reply is set in the communication ID, the type (gray, white, or black) of the list is set in the data part 1, and the contents of the list are set in the date part 2.

Figure 14E:
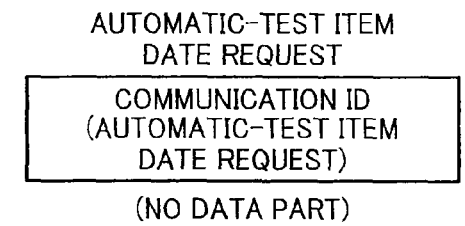

In the automatic-test item date request shown in FIG. 14E, the ID for identifying the automatic-test item date request is set in the communication ID. The automatic-test item date request does not contain any data part.

Figure 14F:
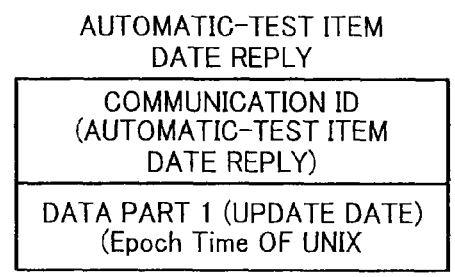

In the automatic-test item date reply shown in FIG. 14F, the ID for identifying the automatic-test item date reply is set in the communication ID, and the update date (for example, Epoch Time of UNIX (registered mark)) is set in the data part 1.

Figure 14G:
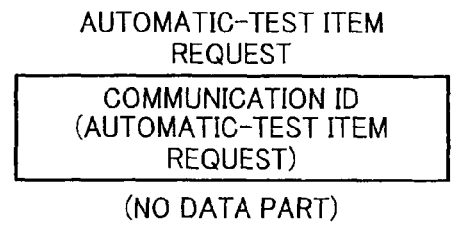

In the automatic-test item request shown in FIG. 14G, the ID for identifying the automatic-test item request is set in the communication ID. The automatic-test item request does not contain any data part.

Figure 14H:
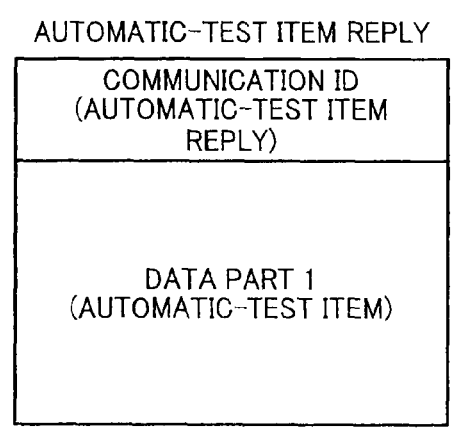

In the automatic-test item reply shown in FIG. 14H, the ID for identifying the automatic-test item reply is set in the communication ID, and the contents of the automatic-test item are set in the data part 1.

As described above, if the USB memory 1300 is connected to the image forming apparatus 1100, the image forming apparatus 1100 is operated in a different manner depending on the list in which the memory device ID of the USB memory 1300 is listed.

If the memory device ID of the USB memory 1300 is listed in the white list, the image forming apparatus 1100 determines that the USB memory 1300 can be used with the image forming apparatus 1100 without condition and then allows the user to use the USB memory 1300 in order to use the functions of the image forming apparatus 1100.

Figure 15:
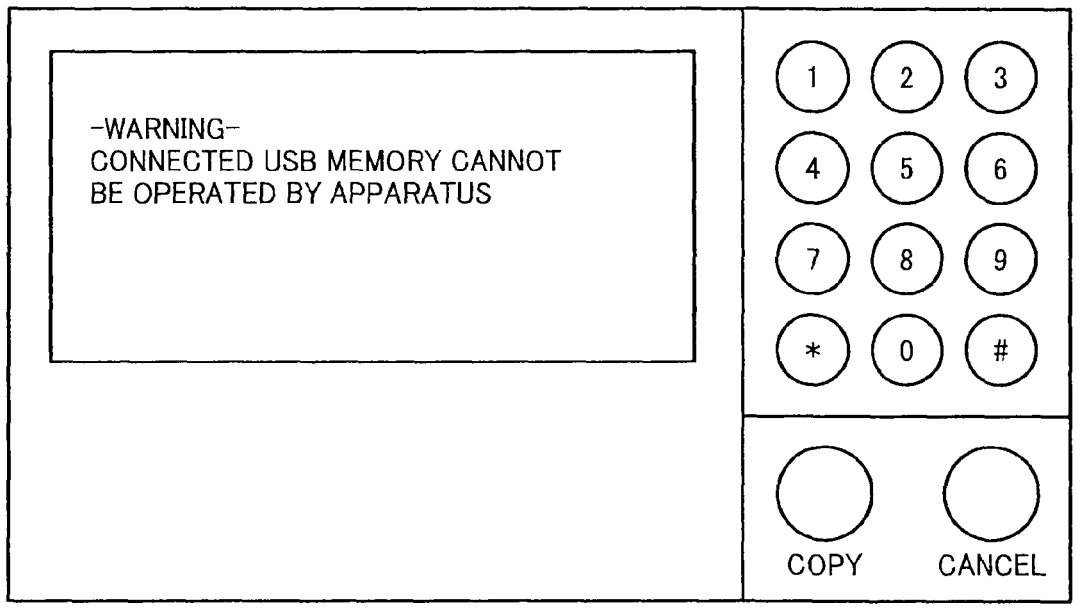
FIG. 15 is a schematic diagram that illustrates an example of the display of an LCD panel shown in FIG. 11 if the memory device ID of a USB memory shown in FIG. 12 connected to the image forming apparatus is listed in the black list.

FIG. 15 is a schematic diagram that illustrates an example of the display of the LCD panel 1111 if the memory device ID of the USB memory 1300 connected to the image forming apparatus 1100 is listed in the black list. If the memory device ID of the USB memory 1300 is listed in the black list, the LCD panel 1111 displays the indication "this memory device cannot be used" (in the example shown in FIG. 15, "the connected USB memory cannot be operated by this apparatus") as a warning, and the user is not allowed to use the USB memory 1300 in order to use the functions of the image forming apparatus 1100.

Figure 16:
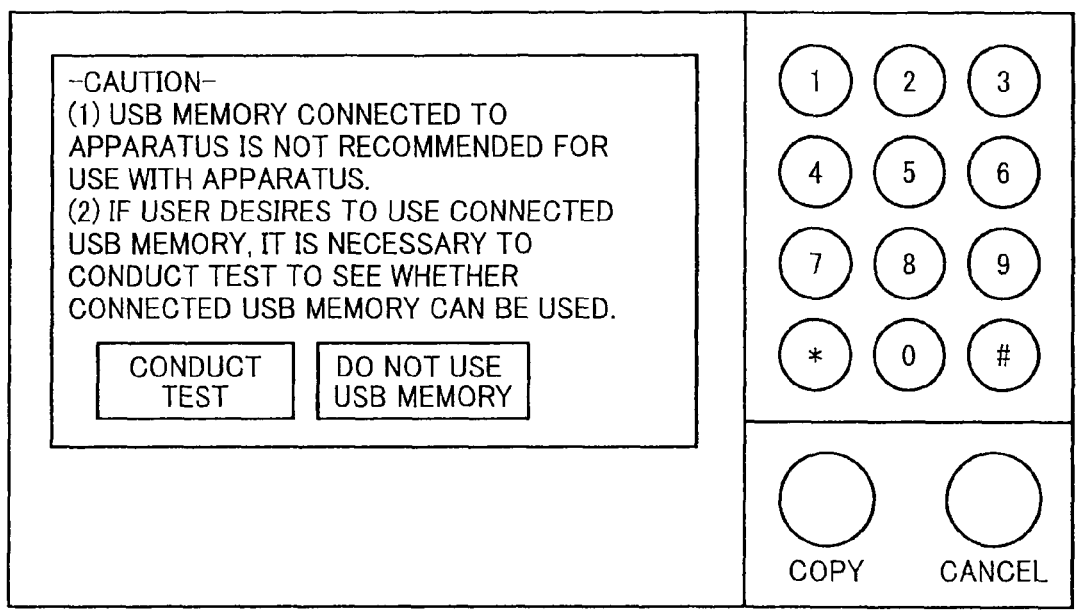
FIG. 16 is a schematic diagram that illustrates an example of the display of the LCD panel if the memory device ID of the USB memory connected to the image forming apparatus is listed in the gray list.

FIG. 16 is a schematic diagram that illustrates an example of the display of the LCD panel 1111 if the memory device ID of the USB memory 1300 connected to the image forming apparatus 1100 is listed in the gray list. If the memory device ID of the USB memory 1300 is listed in the gray list, the user is notified of the following two points: the USB memory 1300 connected to the image forming apparatus 1100 is not recommended for use with the image forming apparatus 1100; and if the user desires to use the USB memory 1300, it is necessary to conduct a test to see whether the USB memory 1300 can be used with the image forming apparatus 1100. The LCD panel 1111 then displays the indications "conduct the test" to see whether the USB memory 1300 can be used and "do not use the USB memory" with the image forming apparatus 1100 so that the user can select any one of the options indicated. At this time, selection buttons for selecting the options are displayed on the LCD panel 1111, as shown in FIG. 16.

Figure 17:
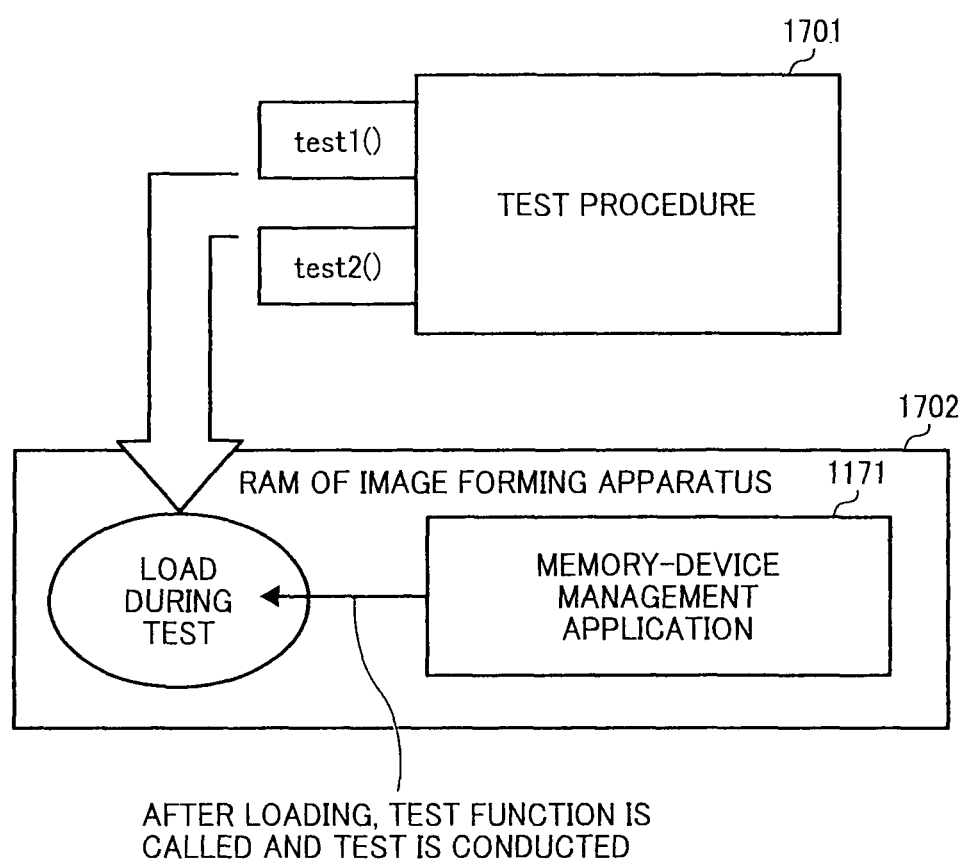
FIG. 17 is a schematic diagram that illustrates the procedure of an automatic test conducted by the image forming apparatus.

If the user has selected the selection button for "conduct the test", the image forming apparatus 1100 conducts the automatic test in accordance with a test procedure 1701 stored in the image forming apparatus 1100. FIG. 17 is a schematic diagram that illustrates the procedure of the automatic test. A dynamic link library (DLL) is used for the test procedure 1701. When the automatic test is conducted, the DLL is loaded into a work area on a RAM 1702 included in the image forming apparatus 1100. After the DLL is loaded, the memory-device management application 1171 calls a test function that is prepared by the DLL. Because the DLL is used, codes for the test procedure 1701 are loaded into the RAM 1702 only when the automatic test is conducted. Therefore, the usage of the RAM 1702 can be reduced.

Figure 18:
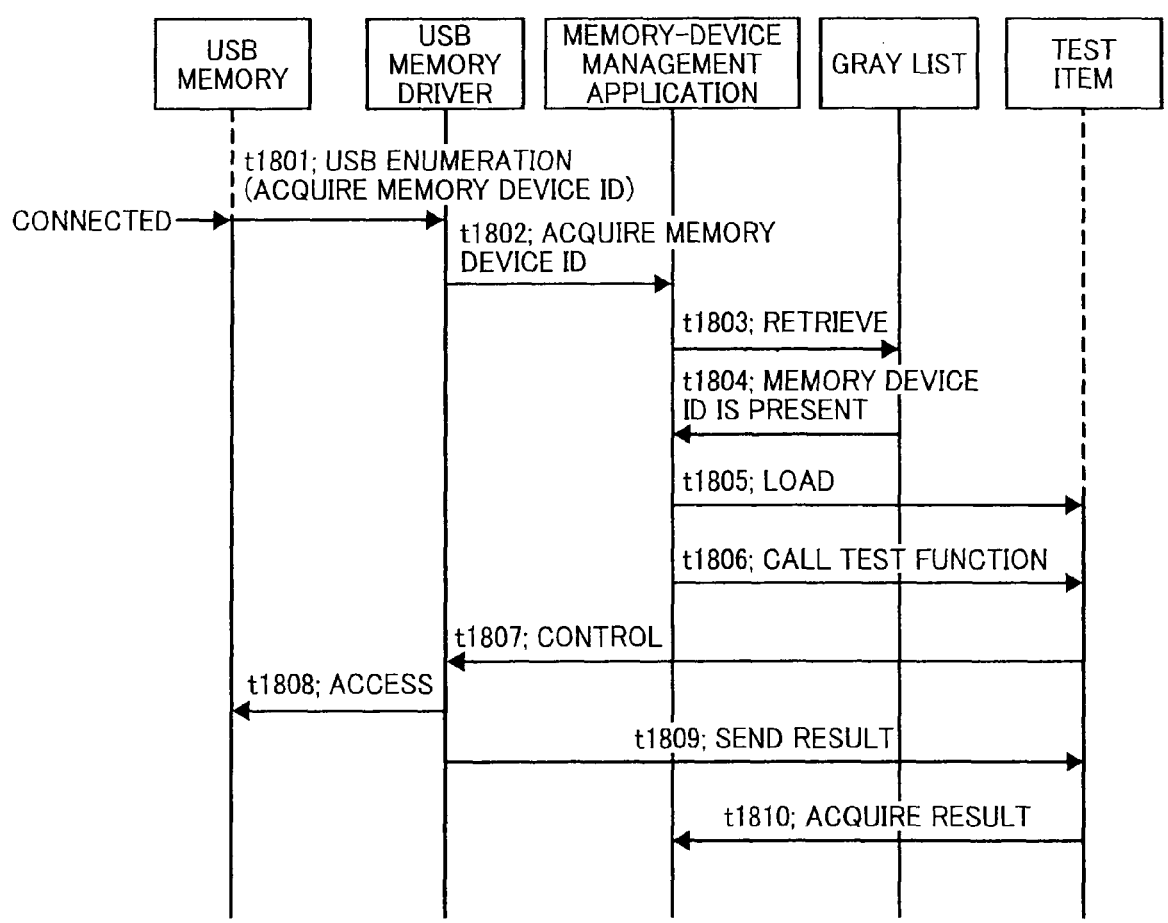
FIG. 18 is a sequence diagram that illustrates a process performed during the automatic test.

As described above, the automatic test is conducted in accordance with a user's instruction if the memory device ID of the connected USB memory 1300 is listed in the gray list or if the memory device ID is not listed in any of the lists. FIG. 18 is a sequence diagram that illustrates the process performed during the automatic test. The process performed when the memory device ID of the USB memory 1300 is listed in the white list and the black list is not shown in FIG. 18.

When the USB memory 1300 is connected to the image forming apparatus 1100, the USB memory driver 1161 performs USB enumeration. At this time, the USB memory driver 1161 acquires the memory device ID of the USB memory 1300 (t1801).

The memory-device management application 1171 then acquires the memory device ID of the USB memory 1300 from the USB memory driver 1161 (t1802).

The memory-device management application 1171 retrieves the acquired memory device ID from the gray list (t1803).

If the memory-device management application 1171 finds the memory device ID of the USB memory 1300 in the gray list (t1804, "the device ID is present"), the memory-device management application 1171 loads a test item into the RAM 1702 (t1805).

The memory-device management application 1171 then calls the test function (t1806). As described above, the automatic-test item contains codes (scripts and operation codes) to conduct the automatic test using the item.

The USB memory driver 1161, in accordance with the called test function (t1807), accesses the USB memory 1300 to conduct a predetermined test (t1808).

A test result is sent from the USB memory driver 1161 to the test function (t1809), and a determination result obtained by the test function is sent to the memory-device management application 1171 (t1810).

Figure 19:
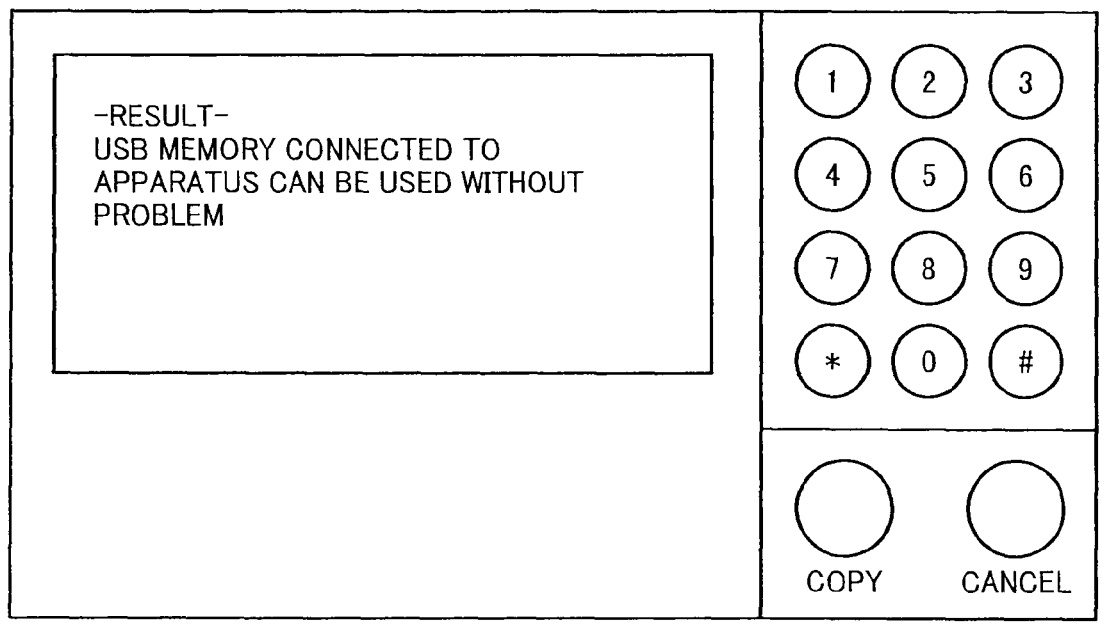
FIG. 19 is a schematic diagram that illustrates an example of the display of the LCD panel when the automatic test has correctly terminated.

FIG. 19 is a schematic diagram that illustrates an example of the display of the LCD panel 1111 when the automatic test has correctly terminated. If the automatic test has been passed, the LCD panel 1111 displays the indication that the automatic test has been passed (in the example shown in FIG. 19, "the USB memory connected to the apparatus can be used without any problem") so that the user is notified of the indication.

Figure 20:
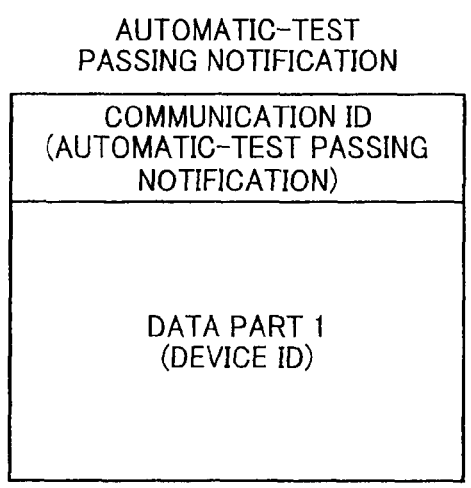
FIG. 20 is a diagram that illustrates the format of communication data (automatic-test passing notification) when the automatic test is passed.

The image forming apparatus 1100 then transmits an automatic-test passing notification to the server 12 in order to notify the memory device ID of the USB memory 1300 and the passing of the automatic test. This communication is performed using the TCP. FIG. 20 is a diagram that illustrates the format of communication data (the automatic-test passing notification) when the automatic test is passed. The communication data contains the communication ID and data part 1. The ID for identifying the automatic-test passing notification is set in the communication ID and the memory device ID is set in the data part 1.

Thus, the user is allowed to use the USB memory 1300 to use the functions of the image forming apparatus 1100.

Figure 21:
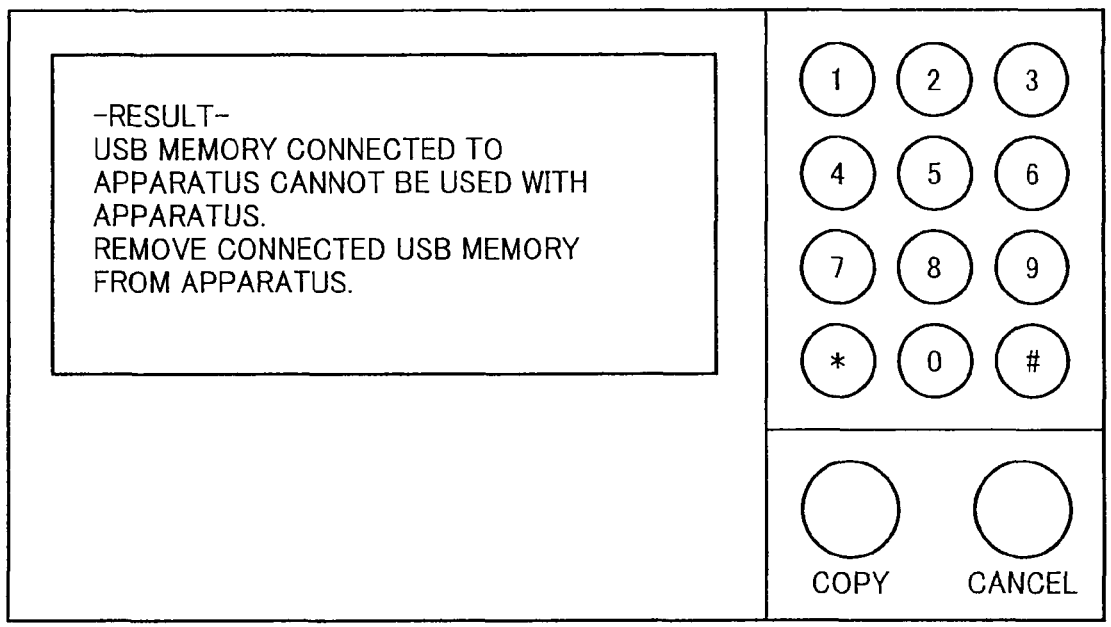
FIG. 21 is a schematic diagram that illustrates an example of the display of the LCD panel when the automatic test is failed.

FIG. 21 is a schematic diagram that illustrates an example of the display of the LCD panel 1111 when the automatic test is failed. If an error is detected in the automatic test, the LCD panel 1111 displays the indications "the automatic test has been failed" (in the example shown in FIG. 21, "the USB memory connected to the apparatus cannot be used with the apparatus") and "the connected memory device needs to be removed from the apparatus" (in the example shown in FIG. 21, "remove the connected USB memory from the apparatus") so that the user is notified of the indications.

Figure 22:
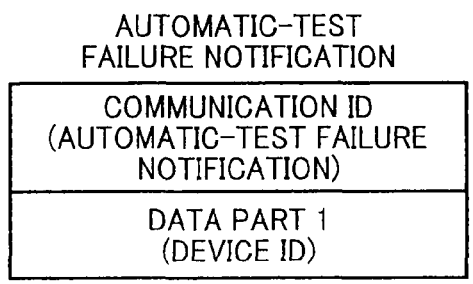
FIG. 22 is a diagram that illustrates the format of communication data (automatic-test failure notification) when the automatic test is failed.

The image forming apparatus 1100 then transmits an automatic-test failure notification to the server 12 in order to notify the memory device ID and the failure of the automatic test. This communication is performed using the TCP. FIG. 22 is a diagram that illustrates the format of communication data (the automatic-test failure notification) when the automatic test is failed. The communication data contains the communication ID and the data part 1. The ID for identifying the automatic-test failure notification is set in the communication ID and the memory device ID is set in the data part 1.

Thus, the user is not allowed to use the image forming apparatus 1100 until the user removes the USB memory 1300 from the image forming apparatus 1100.

FIG. 23 is a schematic diagram that illustrates an example of the display of the LCD panel 1111 when the user has selected the selection button for "do not use the memory device". If the user has selected the selection button for "do not use the memory device", the LCD panel 1111 displays the indication "the connected memory device cannot be used with the apparatus because it is not certain whether the memory device can be used" so that the user is notified of the indication. Furthermore, the LCD panel 1111 displays the indication "remove the connected memory device", whereby the user is not allowed to use the image forming apparatus 1100 until the user removes the USB memory 1300 from the image forming apparatus 1100.

To conduct the automatic test, the image forming apparatus 1100 stores therein the automatic-test item. Because the automatic-test item can be updated, a synchronization process is performed at the following times: when the image forming apparatus 1100 is connected to the server 12 via a network at the time of startup of the image forming apparatus 1100; and when the image forming apparatus 1100 receives the notification that the automatic-test item has been updated from the server 12.

As described above in the operation performed if the user has selected the selection button for "conduct the test", the image forming apparatus 1100 transmits the test result to the server 12. The memory-device management application 1171 transmits the test result to the server 12 via the network management application 1173.

As described above with reference to FIG. 7, the server 12 counts the received test result and performs processing in accordance with the counted test results as described below.

If the USB memory 1300 has accumulated a certain number of test passes, the memory device ID of the USB memory 1300 is moved to the white list. However, if the USB memory 1300 also has accumulated a certain number of test failures, only the number of passes is cleared (set to zero), and the memory device ID is kept in the gray list. The reason why only the number of passes is cleared is to prevent the image forming apparatus 1100 from being operated incorrectly. It is considered that there is a high possibility that the image forming apparatus 1100 will be operated incorrectly if the USB memory 1300 has accumulated a certain number of failures even though the USB memory 1300 has accumulated a certain number of passes.

If the USB memory 1300 has accumulated a certain number of failures, the memory device ID of the USB memory 1300 is moved to the black list.

If the list has been updated in any of the above operations, the server 12 transmits the notification that the list has been updated to the image forming apparatus 1100. The server 12 then transmits the updated list to the image forming apparatus 1100.

In the above descriptions, it is assumed that the image forming apparatus 1100 is connectable to the server 12. If the image forming apparatus 1100 cannot be connected to the server 12 via a network or if the image forming apparatus 1100 cannot be connected to the server 12 due to a network failure, or the like, processing is performed as described below.

A process performed when the USB memory 1300 is connected to the image forming apparatus 1100 while the image forming apparatus 1100 is not connected to the server 12 is substantially the same as that performed while the image forming apparatus 1100 is connected to the server 12. However, a different process is performed if the memory device ID of the USB memory 1300 is listed in the gray list or not listed in any of the lists.

If the memory device ID of the connected USB memory 1300 is listed in the gray list or not listed in any of the lists, the image forming apparatus 1100 notifies the user of the following two points: the USB memory 1300 connected to the image forming apparatus 1100 is not recommended for use with the image forming apparatus 1100; and if the user desires to use the USB memory 1300, it is necessary to conduct a test to see whether the USB memory 1300 can be used with the image forming apparatus 1100. Theses indications are displayed on the LCD panel 1111 so that the user is notified of the indications. As described above with reference to FIG. 16, the LCD panel 1111 displays the indications "conduct the test to see whether the memory device can be used" and "stop using the memory device with the apparatus" so that the user can select any one of the options indicated.

If the user has selected "conduct the test", the memory-device management application 1171 conducts the automatic test in accordance with a predetermined test procedure stored in the image forming apparatus 1100. Thus, the image forming apparatus 1100 checks whether the connected USB memory 1300 can be correctly operated. This process is performed in the same manner as described with reference to FIG. 9.

If the automatic test has been passed, the LCD panel 1111 displays the indication that the automatic test has been passed, as shown in FIG. 19, so that the user is notified of the indication.

Then, the image forming apparatus 1100 adds "1" to the total number of passes stored in the image forming apparatus 1100 so that the image forming apparatus 1100 allows the user to use the USB memory 1300 in order to use the functions of the image forming apparatus 1100.

If an error is detected in the automatic test, the LCD panel 1111 displays the indications "the automatic test has been failed" (in the example shown in FIG. 21, "the USB memory connected to the apparatus cannot be used with the apparatus") and "the connected memory device needs to be removed from the apparatus" (in the example shown in FIG. 21, "remove the connected USB memory from the apparatus") so that the user is notified of the indications.

Then, the image forming apparatus 1100 adds "1" to the total number of failures stored in the image forming apparatus 1100 so that the image forming apparatus 1100 does not allow the use to use the USB memory 1300 in order to use the functions of the image forming apparatus 1100.

The user is not allowed to use the image forming apparatus 1100 until the user removes the USB memory 1300 from the image forming apparatus 1100.

As described above, even if the USB memory has accumulated a large number of passes or failures of the automatic test, the local list stored in the image forming apparatus 1100 is not updated. The reason for this has been described above.

If the image forming apparatus 1100 is connected to the server 12 via the network again, the image forming apparatus 1100 transmits the total number of passes and the total number of failures to the server 12. As described above with reference to FIG. 10, after the server 12 performs the list update process, the synchronization process is performed in order to synchronize the lists, and the local list is deleted. This communication is performed using the TCP.

FIG. 24 is a diagram that illustrates the format of a total test number notification to notify the total number of passes and the total number of failures using the TCP. Headers are not shown in FIG. 24.

There is a possibility that the image forming apparatus 1100 conducts the automatic test on a plurality of USB memories while the image forming apparatus 1100 is not connected to the server 12. Therefore, the total test number notification contains three entries, i.e., the memory device ID, the total number of passes, and the total number of failures, for each device on which the automatic test has been conducted.

In the example shown in FIG. 24, the ID for identifying the total test number notification is set in the communication ID, the number of devices (USB memories) on which the automatic test has been conducted is set in the data part 1, the memory device ID of a device 1 is set in the data part 2, the total number of passes of the device 1 is set in data part 3, and the total number of failures of the device 1 is set in data part 4.

Furthermore, the memory device ID of a device 2 is set in data part 5, the total number of passes of the device 2 is set in data part 6, and the total number of failures of the device 2 is set in data part 7. In this manner, the three entries, i.e., the memory device ID, the total number of passes, and the total number of failures, are generated for each device.

Although a multifunction product (MFP) having the functions of a copier, a printer, a scanner, a facsimile machine, and the like, is explained as the image forming apparatus 1100, the image forming apparatus 1100 can be an image forming apparatus having any one of the functions.

According to an aspect of the present invention, it is possible to easily determine whether a memory device connected to an apparatus can be used with the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic apparatus comprising:
a connecting structure for connecting thereto a dynamically removable memory device;
a storing unit configured to store therein information that includes at least a first list that is a list of memory devices usable with the electronic apparatus, a second list that is a list of memory devices for which it is not certain whether those memory devices are usable with the electronic apparatus, and a third list that is a list of memory device unusable with the electronic apparatus;
a determining unit that determines, by using the information stored in the storing unit, whether a memory device connected to the connecting structure is usable or unusable with the electronic apparatus or determines whether it is not certain whether the memory device is usable with the electronic apparatus;
a testing unit that conducts a test to see whether the memory device is usable with the electronic apparatus if the determining unit determines that it is not certain whether the memory device is usable with the electronic apparatus;
a display unit that displays an indication to a user; and
a presenting unit that causes the display unit to display, if the determining unit determines that the memory device is unusable with the electronic apparatus, an indication that the memory device is unusable with the electronic apparatus, and, if the determining unit determines that it is not certain whether the connected memory device is usable with the electronic apparatus, an indication to cause the user to select that the test be conducted.

2. An electronic apparatus comprising:
a connecting structure for connecting thereto a dynamically removable memory device;
a storing unit configured to store therein information that includes at least a first list that is a list of memory devices usable with the electro sic apparatus, a second list that is a list of memory devices for which it is not certain whether those memory devices are usable with the electronic apparatus, and a third list that is a list of memory device unusable with the electronic apparatus;
a determining unit that determines, by using the information stored in the storing unit, whether a memory device connected to the connecting structure is usable or unusable with the electronic apparatus or determines whether it is no certain whether the memory device is usable with the electronic apparatus;
a testing unit that conducts a test to see whether the memory device is usable with the electronic apparatus if the determining unit determines that it is not certain whether the memory device is usable with the electronic apparatus;
a storage unit that stores therein a result of the test; and a transmitting unit that transmits the result to a server connected to the electronic apparatus via a network, wherein if the electronic apparatus is connected to the network again after being disconnected from the network, the transmuting unit transmits the result of the test stored in the storage unit to the server.

3. A method of controlling an electronic apparatus the electronic apparatus including a connecting structure for connecting thereto a dynamically removable memory device and a storing unit configured to store therein information that includes at least a first list that is a list of memory devices usable with the electronic apparatus, a second list that is a list of memory devices for which it is not certain whether those memory devices are usable with the electronic apparatus, and a third list that is a list of memory device unusable with the electronic apparatus, the method comprising:

determining, by using the information stored in the storing unit, whether a memory device connected to the connecting structure is usable or unusable with the electronic apparatus or determining whether it is not certain whether the memory device is usable with the electronic apparatus;

conducting a test to see whether the memory device is usable with the electronic apparatus if it is determined at the determining that it is not certain whether the memory device is usable with the electronic apparatus; and causing a display unit to display, if it is determined at the determining that the memory device is unusable with the electronic apparatus, an indication that the memory device is unusable with the electronic apparatus, and, if it is determined at the determining that it is not certain whether the connected memory device is usable with the electronic apparatus, an indication to cause the user to select that the test be conducted.

4. A method of controlling an electronic apparatus, the electronic apparatus including a connecting structure for connecting thereto a dynamically removable memory device and a storing unit configured to store therein information that includes at least a first list that is a list of memory usable with the electronic apparatus, a second list that is a list of memory devices for which it is not certain whether those memory devices are usable with the electronic apparatus, and a third list that is a list of memory device unusable with the electronic apparatus, the method comprising:

determining, by using the information stored in the storing unit, whether a memory device connected to the connecting structure is usable or unusable with the electronic apparatus or determining whether it is not certain whether the memory device is usable with the electronic apparatus;

conducting a test to see whether the memory device is usable with the electronic apparatus if it is determined at the determining that it is not certain whether the memory device is usable with the electronic apparatus;

storing a result of the test in a storage unit; and transmitting the result to a server connected to the electronic apparatus via a network, wherein if the electronic apparatus is connected to the network again after being disconnected from the network, the transmitting includes transmitting the result of the test stored in the storage unit to the server.

\* \* \* \* \*